(12) United States Patent
    Chai

(10) Patent No.: US 11,689,902 B2
(45) Date of Patent: *Jun. 27, 2023

(54) METHOD FOR PROCESSING RATE GROUP, METHOD FOR CHARGING FOR DATA SERVICE, AND RELATED DEVICE AND SYSTEM

(71) Applicant: HUAWEI TECHNOLOGIES CO., LTD., Guangdong (CN)

(72) Inventor: Xiaoqian Chai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,159

(22) Filed: May 8, 2022

(65) Prior Publication Data
    US 2022/0264263 A1    Aug. 18, 2022

Related U.S. Application Data

(63) Continuation of application No. 16/552,824, filed on Aug. 27, 2019, now Pat. No. 11,330,409, which is a
(Continued)

(51) Int. Cl.
    *H04W 4/24*    (2018.01)
    *H04L 12/14*   (2006.01)
    (Continued)

(52) U.S. Cl.
    CPC .............. *H04W 4/24* (2013.01); *H04L 12/14* (2013.01); *H04L 12/1407* (2013.01); *H04L 12/6418* (2013.01); *H04L 12/66* (2013.01)

(58) Field of Classification Search
    CPC ....... H04W 4/24; H04W 28/18; H04W 88/16; H04L 12/14; H04L 12/1407; H04L 12/6418; H04L 12/66
    See application file for complete search history.

(56) References Cited

U.S. PATENT DOCUMENTS 8,144,591 B2    3/2012  Ghai et al.
8,437,265 B2    5/2013  Zhi et al.
(Continued)

FOREIGN PATENT DOCUMENTS

CN    1735024 A      2/2006
CN    101296092 A   10/2008
(Continued)

OTHER PUBLICATIONS

3GPP Draft; COM13LS92R1-Attachment 2, 3rd Generation Partnership Project (3GPP), Mobile Competence Centre ; 650, Route Des Lucioles ; F-06921 Sophia-Antipolis Cedex ; France, Apr. 12, 2010 (Apr. 12, 2010), XP050645977, total 8 pages.
(Continued)

*Primary Examiner* — Kibrom T Hailu
(74) *Attorney, Agent, or Firm* — James Anderson Harrison

(57) ABSTRACT

Embodiments of the present invention provide a method for processing a rate group, a method for charging for a data service, and a related device and system, so as to enable a charging system to accurately charge for the data service when the rate group changes. The method includes: determining, by a gateway device, whether a rate group of a service data stream changes; and if the rate group of the service data stream changes, reporting, by the gateway device, charging data to the charging system, so that the charging system performs charging according to the charging data, where the charging data includes service usage information and a reporting reason for reporting the charging data, and the reporting reason indicates a change of the rate group.

28 Claims, 9 Drawing Sheets

A gateway device determines whether a rate group of a service data stream changes — S101

If the rate group of the service data stream changes, the gateway device reports charging data to a charging system, so that the charging system performs charging according to the charging data — S102

Related U.S. Application Data continuation of application No. 15/453,064, filed on Mar. 8, 2017, now Pat. No. 10,462,623, which is a continuation of application No. 14/072,695, filed on Nov. 5, 2013, now Pat. No. 9,628,977, which is a continuation of application No. PCT/CN2011/073756, filed on May 6, 2011.

(51) Int. Cl.
  *H04L 12/66* (2006.01)
  *H04L 12/64* (2006.01)

(56) References Cited

U.S. PATENT DOCUMENTS

| | | | |
|---|---|---|---|
| 8,605,655 B1 * | 12/2013 | Sahai | H04M 15/8016 370/328 |
| 8,675,488 B1 | 3/2014 | Sidebottom et al. | |
| 8,688,551 B2 | 4/2014 | Belling et al. | |
| 8,831,560 B2 | 9/2014 | Cai et al. | |
| 8,856,860 B2 | 10/2014 | Grayson et al. | |
| 9,374,737 B2 | 6/2016 | Martinfz et al. | |
| 9,628,977 B2 | 4/2017 | Chai | |
| 10,462,623 B2 * | 10/2019 | Chai | H04L 12/1407 |
| 11,330,409 B2 * | 5/2022 | Chai | H04L 12/14 |
| 2006/0114913 A1 | 6/2006 | Cai et al. | |
| 2008/0046963 A1 | 2/2008 | Grayson et al. | |
| 2008/0253368 A1 | 10/2008 | Rasanen | |
| 2009/0150340 A1 | 6/2009 | Lhuillier et al. | |
| 2009/0150349 A1 | 6/2009 | Cartin et al. | |
| 2009/0228954 A1 | 9/2009 | Hu et al. | |
| 2009/0264097 A1 | 10/2009 | Cai et al. | |
| 2010/0043053 A1 | 2/2010 | Wei et al. | |
| 2010/0132031 A1 | 5/2010 | Zheng | |
| 2011/0066530 A1 | 3/2011 | Cai et al. | |
| 2011/0067085 A1 | 3/2011 | Brouard et al. | |
| 2011/0096749 A1 | 4/2011 | Rune | |
| 2011/0106933 A1 | 5/2011 | Lövsén et al. | |
| 2011/0131338 A1 | 6/2011 | Hu | |
| 2011/0207432 A1 | 8/2011 | Wu | |
| 2011/0219426 A1 | 9/2011 | Kim et al. | |
| 2011/0238547 A1 | 9/2011 | Belling et al. | |
| 2011/0270722 A1 | 11/2011 | Cai et al. | |
| 2011/0294435 A1 | 12/2011 | Miller et al. | |
| 2012/0144049 A1 | 6/2012 | Nieto et al. | |
| 2013/0054800 A1 | 2/2013 | Fernandez Alonso et al. | |
| 2013/0083806 A1 * | 4/2013 | Suarez Fuentes | H04L 69/22 370/465 |
| 2013/0212265 A1 * | 8/2013 | Rubio Vidales | H04L 43/10 709/224 |
| 2013/0279521 A1 | 10/2013 | Martinez et al. | |
| 2014/0317269 A1 | 10/2014 | Alonso et al. | |
| 2015/0222489 A1 | 8/2015 | Perez Martinez et al. | |

FOREIGN PATENT DOCUMENTS

| | | |
|---|---|---|
| CN | 101355438 A | 1/2009 |
| CN | 101420310 A | 4/2009 |
| CN | 101583115 A | 11/2009 |
| CN | 102026139 A | 4/2011 |
| EP | 2296309 A1 | 3/2011 |
| WO | 2010060457 A1 | 6/2010 |
| WO | 2010066295 A1 | 6/2010 |
| WO | 2010091571 A1 | 8/2010 |
| WO | 2011026523 A1 | 3/2011 |
| WO | 2011047719 A1 | 4/2011 |

OTHER PUBLICATIONS

Nokia,"Monetize over-the-top mobile applications"—Nokia Mobile Application Assurance on the 7750 Service Router Mobile Gateway,Retreived from Internet:https://onestore.nokia.com/asset/180377 on Dec. 9, 2019,total 22 page.

Nokia, "Nokia Cloud Mobile Gateway Release 11",Retreived from Internet:https://onestore.nokia.com/asset/202127 on Dec. 9, 2019,total 8 page.

Nokia,"Nokia 7750 Service Router Mobile Gateway"—Integrated Services Module Mobile Gateway,Retreived from Internet on Dec. 9, 2019,total 6 page.

3GPP TS 32.296 V9.1.0,3rd Generation Partnership Project; Technical Specification Group Service and System Aspects;Telecommunication management;Charging management;Online Charging System (OCS): Applications and Interfaces(Release 9),Dec. 2009,total 77 pages.

3GPP TS 23.203 V11.1.0,3rd Generation Partnership Project;Technical Specification Group Services and System Aspects;Policy and charging control architecture(Release 11),Mar. 2011,total 136 pages.

3GPP TS 29.212 V11.0.1,3rd Generation Partnership Project;Technical Specification Group Core Network and Terminals;Policy and Charging Control over Gx reference point(Release 11),Mar. 2011,total 132 pages.

3GPP TS 32.251 V10.4.0,3rd Generation Partnership Project;Technical Specification Group Services and System Aspects;Telecommunication management;Charging management;Packet Switched (PS) domain charging(Release 10),Mar. 2011,total 82 pages.

3GPP TS 32.299 V10.1.0,3rd Generation Partnership Project Technical Specification Group Services and System Aspects;Telecommunication management;Charging management;Diameter charging applications(Release 10),Mar. 2011,total 148 pages.

\* cited by examiner

METHOD FOR PROCESSING RATE GROUP, METHOD FOR CHARGING FOR DATA SERVICE, AND RELATED DEVICE AND SYSTEM

CROSS-REFERENCE TO RELATED APPLICATIONS

This application is a continuation of U.S. patent application Ser. No. 16/552,824 filed on Aug. 27, 2019, which is a continuation of U.S. patent application Ser. No. 15/453,064, filed on Mar. 8, 2017, which is a continuation of U.S. patent application Ser. No. 14/072,695, filed on Nov. 5, 2013, now U.S. Pat. No. 9,628,977. which is a continuation of International Application No. PCT/CN2011/073756, filed on May 6, 2011. All of the afore-mentioned patent applications are hereby incorporated by reference in their entireties.

TECHNICAL FIELD

The present invention relates to the field of communications, and in particular, to a method for processing a rate group, a method for charging for a data service, and a related device and system.

BACKGROUND

Large-scale deployment of 3rd generation mobile communications greatly drives usage of a data service, and accurate charging of the data service is a basis for conduction of the data service. Policy and charging control (PCC) is a set of policy and charging control mechanisms defined by the 3rd Generation Partnership Project (3GPP). The core of a PCC mechanism is as follows: When establishing a bearer for a data stream, a gateway (GateWay) device requests a charging control policy of the data stream from a policy and charging rules function (PCRF); if an application function (AF) provides service-layer information of a service for the PCRF, the PCRF generates a dynamic control policy for charging and service data stream or determines a static control policy to be activated for charging and service data stream, according to subscriber information stored in a subscription profile repository (SPR), bearer-layer information provided by the gateway, certain local policies that are configured by an operator in the PCRF and the service-layer information. The PCRF delivers a command for installing the generated dynamic policy or activating the determined static policy stored in the gateway to a policy and charging enforcement function (PCEF) in the gateway; and the PCEF performs, according to the installed/activated policy, resource allocation, data stream control, and charging control. The PCC mechanism can implement, according to a policy of the operator, precise control on a service data stream, so as to implement fine-grained operation of bandwidth.

In the preceding PCC mechanism, the AF is a service network element, and provides information related to a service accessed by a subscriber. For example, the AF can provide information such as a service identifier, a service priority indication, and a service urgency indication for the PCRF.

In the PCC, the PCRF is a policy decision entity responsible for controlling QoS, bandwidth, gating, charging control policies, and so on when a user equipment uses a service in a home network, and generating a dynamic policy or specifying a static policy, where the policy is executed by the policy and charging enforcement function.

The PCEF is a policy execution entity, and is configured to execute a dynamic control policy delivered by the PCRF or a specified static control policy, and may be located in a gateway device, such as a GGSN, a P-GW, or a WAP gateway.

The SPR is a subscription data storage entity and stores subscription data of the subscriber.

When the PCEF performs charging control, a case where a rate group changes may appear in certain scenarios. With regard to a change of a rate group on a side of a network element, the prior art has not provided an appropriate processing method for a charging system to perform charging. As a result, after the rate group changes, an existing charging system fails to receive accurate information and then fails to perform precise processing according to the change of the rate group, thereby affecting charging accuracy. Meanwhile, because accurate processing cannot be performed on the change of the rate group, a problem where partial traffic before service identification cannot be accurately charged may appear in PCRF-based data service charging control.

SUMMARY

Embodiments of the present invention provide a method for processing a rate group, a method for charging for a data service, and a related device and system, so as to enable a charging system to accurately charge for the data service when the rate group changes.

An embodiment of the present invention provides a method for processing a rate group, including: determining, by a gateway device, whether a rate group of a service data stream changes; and if the rate group of the service data stream changes, reporting, by the gateway device, charging data to a charging system, so that the charging system performs charging according to the charging data, where the charging data includes service usage information and a reporting reason for reporting the charging data, and the reporting reason indicates a change of the rate group.

An embodiment of the present invention provides a method for charging for a data service, including: receiving, by a charging system, charging data reported by a gateway device when the gateway device determines that a rate group of a service data stream changes, where the charging data includes service usage information and a reporting reason for reporting the charging data, and the reporting reason indicates a change of the rate group; determining, by the charging system, a rate of the service data stream according to the reporting reason and an original rate group; and performing, by the charging system, fee deduction on the service usage information according to the determined rate.

An embodiment of the present invention provides a method for charging for a data service, including: determining, by a policy and charging rules function PCRF entity, according to an identification result of identifying a service, whether to charge at a network layer and to deliver a charging control policy to a gateway device after generating the charging control policy, so that the gateway device executes the charging control policy; and regenerating, if the PCRF confirms that it is necessary to change the charging control policy, a charging control policy, and delivering the charging control policy to the gateway device.

An embodiment of the present invention provides a gateway device, including: a rate group change determining module, configured to determine whether a rate group of a service data stream changes; and a charging data reporting module, configured to report, if the rate group change determining module determines that the rate group of the service data stream changes, charging data to a charging system, so that the charging system performs charging according to the charging data, where the charging data includes service usage information and a reporting reason for reporting the charging data, and the reporting reason indicates a change of the rate group.

An embodiment of the present invention provides a charging system, including: a charging data receiving module, configured to receive charging data reported by a gateway device when the gateway device determines that a rate group of a service data stream changes, where the charging data includes service usage information and a reporting reason for reporting the charging data, and the reporting reason indicates a change of the rate group; a rate determining module, configured to determine a rate of the service data stream according to the reporting reason and an original rate group; and a fee deducting module, configured to perform fee deduction on the service usage information according to the determined rate.

An embodiment of the present invention provides a policy and charging rules function entity, including: a determining module, configured to determine, according to an identification result of identifying a service, whether it is necessary to charge at a network layer and to deliver a charging control policy to a gateway device after generating the charging control policy, so that the gateway device executes the charging control policy; and a charging control policy generating module, configured to regenerate, if it is confirmed that it is necessary to change the charging control policy, a charging control policy, and to deliver the charging control policy to the gateway device.

It can be seen from the preceding embodiments of the present invention that, a gateway device can determine whether a rate group of a service data stream changes, and when the rate group of the service data stream changes, report charging data including a re-determined rate group to a charging system, so that the charging system performs charging according to the charging data. Therefore, compared with the prior art, the method for processing a rate group that is provided by the embodiments of the present invention can enable the charging system to know a change of the rate group, thereby reducing impacts of the change of the rate group on charging accuracy and making the charging more accurate.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Embodiments of the present invention provide a method for processing a rate group, a method for charging for a data service, and a related device and system, so as to enable a charging system to accurately charge for the data service when the rate group changes.

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

A rate group (Rate Group) in the present invention is used to combine one or more services, which have same costs or rating types, for ease of rating by a charging system. A concept of the rate group in the present invention is different from that of a conventional rate. The rate refers to a unit price specified for each type of charging units. The rate group may be used as a basis for the charging system to select a rate. Therefore, a change of the rate group may lead to a change of the rate, whereas the change of the rate has no impact on the rate group.

Figure 1:
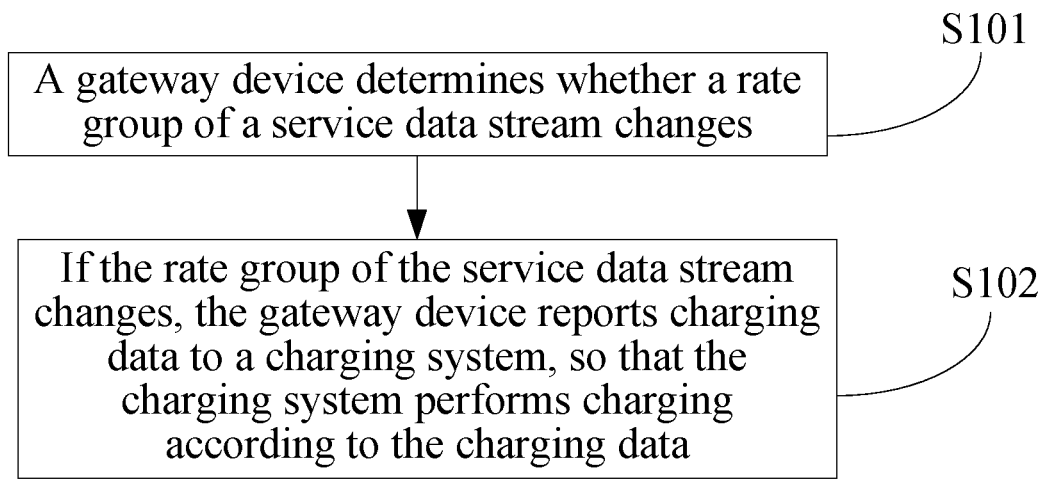
FIG. 1 is a schematic flowchart of a method for processing a rate group according to an embodiment of the present invention.

Refer to FIG. 1, which is a schematic flowchart of a method for processing a rate group according to an embodiment of the present invention. An execution subject of the method may be a gateway device. The following steps are mainly included:

S101. A gateway device determines whether a rate group of a service data stream changes.

In the embodiment of the present invention, the gateway device refers to a gateway at a network layer, and includes a gateway general packet radio service support node (GGSN), a packet data network gateway (Packet Data Network Gateway, P-GW), a Wireless Application Protocol (WAP) gateway, and so on. One aspect that these gateway devices have in common is that a policy and charging enforcement function (PCEF) may be included therein. A PCRF entity is a policy decision entity, and may exist separately or may be incorporated into another entity.

In the method for processing the rate group of the present invention, the gateway device may determine, as the following embodiments, whether the rate group of the service data stream changes:

Embodiment 1: The gateway device parses a service packet of the service data stream according to a service identification rule, and re-determines a rate group according to a parsed result and rate group configuration of the gateway device, and if the re-determined rate group is different from a current rate group, determines that the rate group of the service data stream changes. That is to say, the gateway device is configured with a deep packet inspection (DPI) identification rule, parses information of a service stream according to the DPI identification rule configured in the gateway device, and changes a charging control policy according to a parsed result, where the charging control policy includes a change of the rate group. Specifically speaking, the gateway device parses the service packet of the service data stream according to the DPI identification rule configured in the gateway device to acquire application-layer information of the service data stream, for example, what is obtained through parsing is a uniform resource locator (URL) of the service data stream, which protocol the data stream is adopted, which application the service data stream belongs to, and what type the application is (for example, a streaming medium), and so on. After the result is obtained through parsing, a rate group is re-determined according to the rate group configuration (for example, a matching relationship between a rate group and a service data stream) of the gateway device. If the re-determined rate group is different from the current rate group, it is determined that the rate group changes and the gateway device triggers a charging procedure for the change of the rate group. It should be noted that, in this embodiment, the current rate group is an effective rate group currently allocated in the gateway device to the service data stream, and may be delivered previously by the PCRF to the gateway device or may be in a static policy configured in the gateway device.

Embodiment 2: The gateway device receives an identification rule and a corresponding charging control policy that are delivered by the policy and charging rules function PCRF entity, where the charging control policy includes a rate group; and then, the gateway device parses a service packet of the service data stream according to the identification rule delivered by the PCRF entity, matches, according to a parsed result, the rate group delivered by the PCRF entity to re-determine a rate group, and if the re-determined rate group is different from a current rate group, determines that the rate group of the service data stream changes. That is to say, a PCRF in a home domain delivers a DPI identification rule and a corresponding charging control policy to the gateway device, and the gateway device parses information of a service stream according to the delivered DPI identification rule and executes the charging control policy according to the parsed result, where the charging control policy includes a change of the rate group. In this embodiment, the DPI identification rule that the PCRF in the home domain delivers to the gateway device is based on the following mechanism: The PCRF determines, according configuration of an operator or subscription data of a subscriber, that it is necessary to perform DPI; then, for each gateway device, a list of locations of corresponding DPI modules is configured in the PCRF to successfully download a DPI identification rule,

TABLE 1

| GGSN IP | DPI Type | DPI IP/Port | List of rules or list of identifiers supported by a DPI module | as shown in Table 1 (a GGSN in the GPRS is taken as an example) above, where the DPI Type indicates whether a DPI module is built into or out of the gateway device (for example, a GGSN); the PCRF determines, by querying the list, a DPI module corresponding to the gateway device, so as to know whether the gateway device has a DPI capability, and if yes, delivers the DPI identification rule to the gateway device; after receiving the DPI identification rule delivered by the PCRF, the gateway device parses the service packet of the service data stream according to the DPI identification rule to acquire application-layer information of the service data stream, for example, what is obtained through parsing is a URL of the service data stream, which protocol adopted, which application the service data stream belongs to, what type the application is (for example, a streaming medium), and so on, and after the result is obtained through parsing, re-determines a rate group according to the rate group included in the charging control policy delivered by the PCRF; and if the re-determined rate group is different from an original rate group, it is determined that the rate group changes, and the gateway device triggers a charging procedure for the change of the rate group. Similar to the preceding Embodiment 1, in this embodiment, the current rate group is an effective rate group currently allocated in the gateway device to the service data stream, and may be delivered previously by the PCRF to the gateway device or may be one in a static policy configured in the gateway device.

Embodiment 3: The gateway device receives an identification rule identifier and a corresponding charging control policy that are delivered by the policy and charging rules function PCRF entity. In this embodiment, the identification rule identifier is used to identify an identification rule or a group of identification rules and may correspond to one or more applications, and the charging control policy includes a rate group. The gateway device matches, by using the identification rule identifier delivered by the PCRF entity an identification rule configured in the gateway device, and parses a service packet of the service data stream according to the matched identification rule, then matches the rate group delivered by the PCRF entity according to a parsed result to re-determine a rate group, and if the re-determined rate group is different from a current rate group, determines that the rate group of the service data stream changes. That is to say, a DPI identification rule is configured in the gateway device, a DPI identification rule identifier is allocated to the configured DPI identification rule, a PCRF in a home domain delivers the DPI identification rule identifier and a corresponding charging control policy, and the gateway device matches, according to the delivered DPI identification rule identifier, the DPI identification rule configured in the gateway device, thereby parsing information of the service data stream by using the DPI identification rule and executing the charging control policy according a parsed result, where the charging control policies include the change of the rate group. In this embodiment, the DPI identification rule configured in the gateway device is based on the following mechanism: For each gateway device, a list of locations of corresponding DPI modules (as specifically shown in Table 1 of the preceding Embodiment 2) is configured in the PCRF to successfully download the DPI identification rule; the gateway device executes the DPI identification rule to parse the service packet of the service data stream, so as to acquire application-layer information of the service data stream, for example, what is obtained through parsing is a URL of the service data stream, which protocol adopted, which application the service data stream belongs to, what type the application is (for example, a streaming medium), and so on; after a result is obtained through parsing, a rate group is re-determined according to the rate group included in the charging control policy delivered by the PCRF; and if the re-determined rate group is different from an original rate group, it is determined that the rate group changes, and the gateway device triggers a charging procedure for the change of the rate group. Similar to the preceding Embodiment 1 or 2, in this embodiment, the current rate group is an effective rate group currently allocated in the gateway device to the service data stream, and may be delivered previously by the PCRF to the gateway device or may be one in a static policy configured in the gateway device. It should be noted that, in this embodiment, the DPI identification rule identified by the DPI identification rule identifier may be a DPI identification rule of a different granularity for identifying, for example, a certain URL, a certain type of URLs, a certain type of application protocols, a certain specific application or a certain type of applications (for example, a type of peer-to-peer P2P download).

Embodiment 4: The gateway device receives a charging control policy update command delivered by the policy and charging rules function PCRF entity, where the charging control policy update command includes a rate group, and if the rate group included in the charging control policy update command is different from a current rate group, determines that the rate group of the service data stream changes. That is to say, according to the rule of the PCRF, information from an application layer, or a result obtained from DPI performed by a DPI network element, the PCRF remakes a policy decision for the service data stream, decides a new charging control policy, delivers and installs the charging control policy into the gateway device, where the charging control policy includes a new rate group; the gateway device receives a policy and charging control rule (PCC Rule) delivered by a PCRF in a home domain and updates an existing PCC rule, where the rate group is updated in the new PCC rule; and the gateway device triggers a charging procedure for the change of the rate group.

S102. If the rate group of the service data stream changes, the gateway device reports charging data to the charging system, so that the charging system performs charging according to the charging data.

It should be noted that, in the embodiment of the present invention, the rate group has a priority attribute, that is, rate groups may have a different priority, so that the charging system is capable of determining an appropriate rate group for service usage information according to the priority of the rate group and performing charging according to the determined rate group.

After detecting the change of the rate group, the gateway device disables a counter of the service data stream to stop counting the service usage information (the service usage information corresponds to the original rate group, and the original rate group in the present invention is the current rate group corresponding to the counted service usage information), and reports the charging data to the charging system. The charging data includes the service usage information (such as, data traffic or duration of an Internet subscriber) counted by the counter of the service data stream, a reporting reason for reporting the charging data, and so on. A value of the reporting reason (for online charging, it is Reporting-Reason AVP; and for offline charging, it is Change-Condition AVP) carried in the reported charging data, is RATING_GROUP_CHANGE, indicating that reporting the charging data is because the rate group of the service data stream changes. In the embodiment of the present invention, the change of the rate group is used as a chargeable event (chargeable event).

In the embodiment of the present invention, if the charging system is an offline charging system, the gateway device reports the charging data to the charging system as follows: The gateway device reports the service usage information to a charging data function module, so that the charging data function module encapsulates the service usage information into a charging data record (CDR), or the gateway device encapsulates the service usage information and reports the CDR obtained after the encapsulation to the charging system. After the gateway device reports the charging data to the offline charging system, the gateway device enables a new counter to re-record usage information of the service data stream and reports the usage information to the offline charging system when a condition for reporting is met. The condition for reporting includes reporting at a rate change time point, and so on, where the rate change time point is configured in the gateway.

In the embodiment of the present invention, if the charging system is an online charging system, that the gateway device reports the charging data to the charging system includes: the gateway device reports authorized usage information of the original rate group, to the online charging system. Specifically, the authorized usage information of the original rate group is reported by using a Used-Service-Unit parameter carried in a Diameter Credit Control Request command. If the service data stream still requires charging after the rate group of the service data stream changes, the gateway device applies, based on the rate group included in the charging control policy update command or the re-determined rate group, to the online charging system for credit authorization after the gateway device reports the charging data to the online charging system. Specifically, the credit authorized application is sent by using a Requested-Service-Unit parameter carried in the Diameter Credit Control Request command. The gateway device receives the credit authorization granted, based on the rate group included in the charging control policy update command or the re-determined rate group, by the online charging system, enables a new counter to re-record usage information of the service data stream, and reports the usage information to the online charging system when a condition for reporting is met. The condition for reporting may include: service start, service end, exhaustion of authorized credit quota, expiration of authorized credit quota, credit update required by the online charging system, re-authorization delivered by the online charging system, and so on.

After receiving the charging data reported by the gateway device, the charging system re-determines a rate of the service data stream according to the reporting reason and the original rate group, and performs fee deduction according to the re-determined rate. The following embodiment will give a detailed description.

It can be seen from the preceding embodiment of the present invention that, a gateway device can determine whether a rate group of a service data stream changes, and when the rate group of the service data stream changes, report charging data including a re-determined rate group to a charging system, so that the charging system performs charging according to the charging data. Therefore, compared with the prior art, the method for processing a rate group that is provided by the embodiment of the present invention can enable the charging system to know a change of the rate group, thereby reducing impacts of the change of the rate group on charging accuracy and making the charging more accurate.

Figure 2:
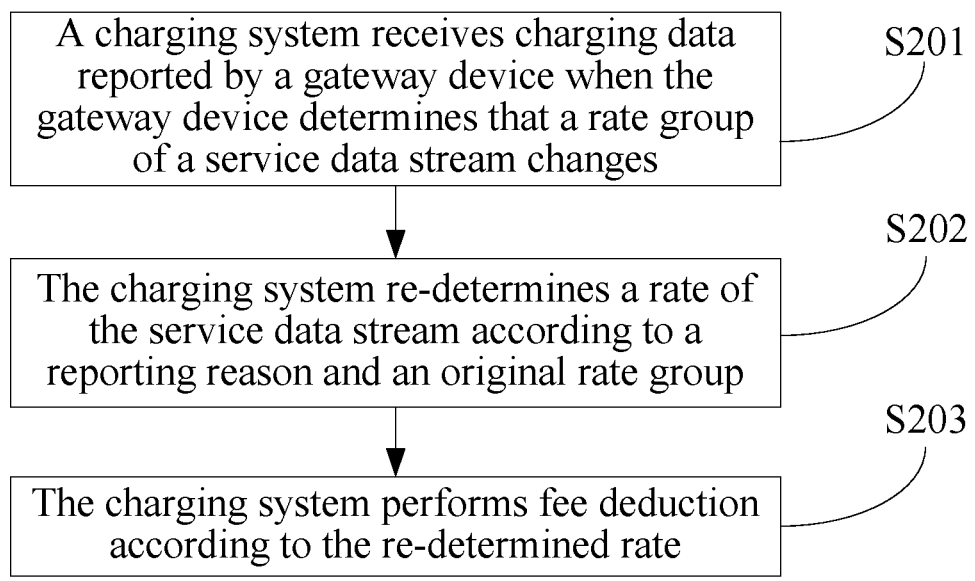
FIG. 2 is a schematic flowchart of a method for charging for a data service according to an embodiment of the present invention.

Refer to FIG. 2, which is a schematic flowchart of a method for charging for a data service according to an embodiment of the present invention. An execution subject of the method may be a charging system (including an online charging system and an offline charging system). The following steps are mainly included:

S201. A charging system receives charging data reported by a gateway device when the gateway device determines that a rate group of a service data stream changes.

In this embodiment, the charging data includes service usage information and a reporting reason for reporting the charging data, where the reporting reason indicates that the gateway device reports the charging data because the rate group of the service data stream changes.

S202. The charging system re-determines a rate of the service data stream according to the reporting reason and an original rate group.

In the method for charging for a data service that is provided by the present invention, the charging system may re-determine, as the following embodiments, the rate of the service data stream according to the reporting reason and the original rate group:

Embodiment 1: If the original rate group is a high-priority rate group, the rate of the service data stream is re-determined by using the original rate group. It should be noted that, in the embodiment of the present invention, the so-called high-priority rate group refers to a rate group preferentially used by the charging system to determine a rate, and then perform pricing and fee deduction on the reported service usage information, and so on.

Embodiment 2: If the original rate group is a low-priority rate group, the charging system stores usage information of the service data stream, and when receiving a high-priority rate group, re-determines the rate of the service data stream, or if the charging system does not receive a high-priority rate group before the service ends (for example, a charging session may end) or before a preset timeout setting is exceeded, re-determines the rate of the service data stream by using the original rate group. It should be noted that, in the embodiment of the present invention, the low-priority rate group not only represents a rate but also is used to express an indication, that is, indicating that the charging system preferentially uses another high-priority rate group and uses the low-priority rate group only when no high-priority rate group exists.

S203. The charging system performs fee deduction according to the re-determined rate.

For example, if the charging system has not received a high-priority rate group before the service ends or a preset timeout setting is exceeded, the rate of the service data stream is re-determined by using the original rate group and fee deduction is performed according to the re-determined rate; that is, if the original rate group is a low-priority rate group corresponding to a rate of 0, fee deduction is not performed on the service usage information corresponding to the service data stream and the original rate group during this service charging, and if fee deduction has already been performed, a fee return procedure is enabled to return the deducted fee. Specifically, the charging system stores the service usage information; after receiving a new high-priority rate group that may be used for the service data stream, uses the new rate group to perform rating and fee deduction, and if no new rate group is received before the service ends or before the preset timeout setting is exceeded, uses the low-priority rate group to perform rating and fee deduction; and if a rate corresponding to the low-priority rate group is 0, does not perform fee deduction on the service usage information corresponding to the service data stream and the rate group during this service charging, and if fee deduction has already been performed, enables a fee return procedure to return the deducted fee.

It can be seen from the method for charging for a data service shown in FIG. 2 that, a charging system may re-determine a rate of a service data stream according to a reporting reason for reporting charging data and an original rate group, where the charging data is reported by a gateway device, and perform fee deduction according to the re-determined rate, and furthermore, flexibly indicate that the charging system selects, by distinguishing between priorities of rate groups, a rate group with the highest priority to perform charging. Therefore, the method for charging for a data service that is provided by the embodiment of the present invention reduces impacts of a change of a rate group on charging accuracy and making the charging more accurate.

Figure 3:
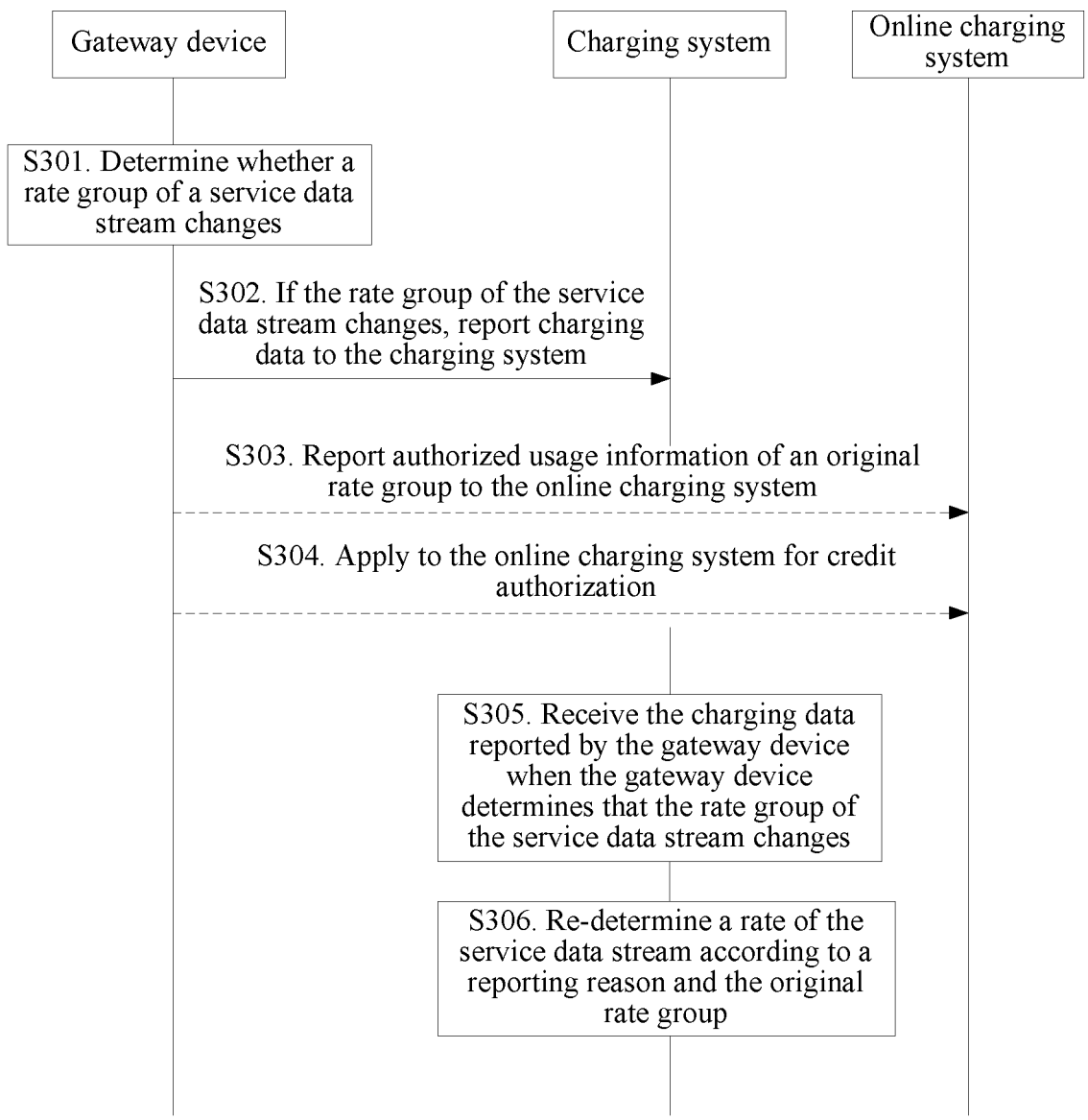
FIG. 3 is a schematic flowchart of interaction of devices in a method for charging for a data service according to an embodiment of the present invention.

The following further describes the method for charging for a data service that is provided by the present invention with reference to the embodiments in FIG. 1 and FIG. 2. Refer to FIG. 3, which is a schematic flowchart of interaction of devices in a method for charging for a data service according to an embodiment of the present invention. The following steps are mainly included:

S301. A gateway device determines whether a rate group of a service data stream changes.

As previously mentioned, the gateway device may determine, based on a result obtained by parsing a service packet of the service data stream according to a service identification rule, whether the rate group of the service data stream changes; determine, based on a result obtained by parsing a service packet of the service data stream according to an identification rule delivered by a PCRF entity, whether the rate group of the service data stream changes; determine, based on a result obtained by parsing a service packet of the service data stream according to an identification rule matching the identification rule identifier delivered by the PCRF entity, whether the rate group of the service data stream changes; or determine, according to whether the rate group is updated in a charging control policy update command delivered by the PCRF entity, whether the rate group of the service data stream changes.

S302. If the rate group of the service data stream changes, the gateway device reports charging data to a charging system.

After detecting that the rate group changes, the gateway device disables a counter of the service data stream (the counter corresponds to an original rate group) and reports the charging data to the charging system. The charging data includes service usage information (such as, data traffic or duration of an Internet subscriber) counted by the counter of the service data stream, a reporting reason for reporting the charging data, and so on.

If the charging system is an online charging system, the gateway device reports authorized usage information of the original rate group to the online charging system (step S303). Furthermore, if the service data stream still requires charging after the rate group of the service data stream changes, the gateway device further applies, based on a rate group included in a charging control policy update command or a re-determined rate group, to the online charging system for credit authorization after the gateway device reports the authorized usage information of the original rate group to the online charging system (step S304).

S305. The charging system receives the charging data reported by the gateway device when the gateway device determines that the rate group of the service data stream changes.

S306. The charging system re-determines a rate of the service data stream according to a reporting reason and the original rate group.

For example, according to a priority of the rate group, if the original rate group is a high-priority rate group, the charging system may use the original rate group to re-determine the rate of the service data stream; or if the original rate group is a low-priority rate group, the charging system stores usage information of the service data stream, and when receiving a high-priority rate group, re-determines the rate of the service data stream, or when the charging system does not receive a high-priority rate group, re-determines the rate of the service data stream by using the original rate group.

Figure 4:
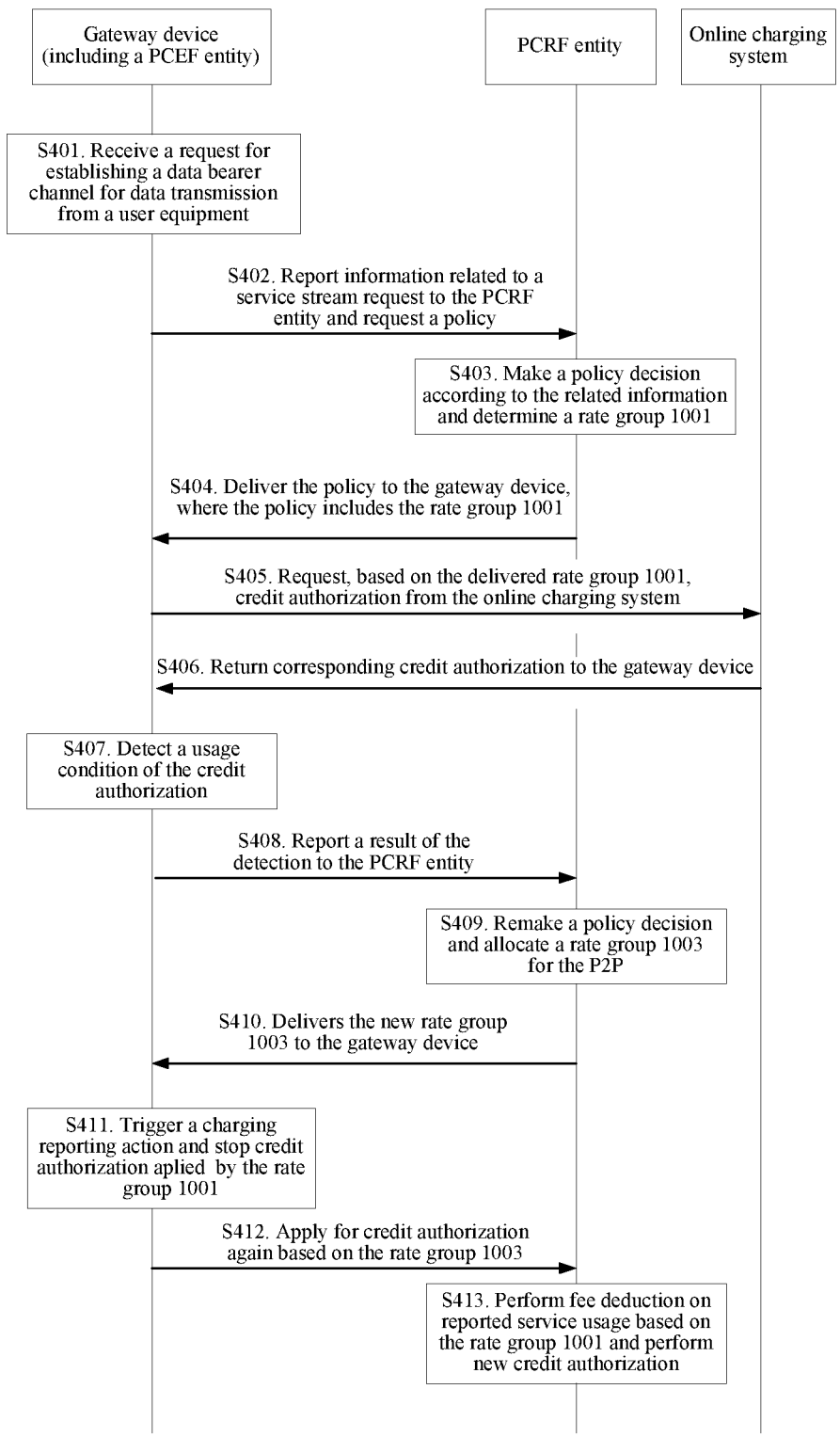
FIG. 4 is a schematic flowchart of interaction of devices in a method for charging for a data service according to another embodiment of the present invention.

To clearly describe a procedure for interaction of devices in the method for charging for a data service shown in FIG. 3, the following takes Internet access (online charging is taken as an example) as an example for description. Refer to FIG. 4, and it is assumed that an operator may carry out an ordinary rate for ordinary network use (such as, news browse, information query, and forum discussion) and carry out a comparatively high rate for peer-to-peer (P2P) network use increasing network pressure. This embodiment takes ordinary network use and P2P applications as an example for description, where a rate group 1001 has a same priority as a rate group 1003. The example shown in FIG. 4 mainly includes the following steps:

S401. When a subscriber accesses the Internet, a user equipment requests a gateway device (including a PCEF entity) to establish a data bearer channel for data transmission.

S402. The gateway device reports information related to a service stream to a PCRF and requests a policy, where the policy includes QoS, gating, and charging control policies, and so on.

S403. According to information related to a service stream that is provided by gateway device and in combination with configured information of the PCRF, subscription information from the outside, subscriber information or account information of the subscriber, and so on, the PCRF makes a policy decision, allocates QoS to the subscriber for Internet access, and determines the rate group 1001.

S404. The PCRF delivers the policy to the gateway device, where the policy carries the QoS allocated to the subscriber for Internet access and the rate group 1001.

S405. The gateway device requests, based on the rate group 1001 delivered by the PCRF, credit authorization from an online charging system.

S406. The online charging system determines a rate according to a subscriber type, a package type, a reward policy, rate group information, and so on, performs the credit authorization according to the rate and the account information of the subscriber, and returns corresponding credit authorization to the gateway device.

S407. The subscriber uses a service, and the gateway device detects a usage condition of the credit authorization.

S408. A DPI module (which may be built into the gateway device, or built out as an independent DPI network element) detects that the subscriber uses a P2P request and reports a result of the detection to the PCRF.

S409. The PCRF remakes a policy decision based on a result of the detection and allocates the rate group 1003 for the P2P.

S410. The PCRF delivers the new rate group 1003 to the gateway device.

S411. The gateway device detects that the rate group changes, triggers a charging reporting action, and stops using the credit authorization applied by the rate group 1001 for the service.

S412. Apply for credit authorization again based on the rate group 1003.

S413. After receiving service usage information reported by the gateway device, the online charging system decides, according to priorities of the rate group 1001 and the rate group 1003, to perform fee deduction on the reported service usage information by taking the rate group 1001 as a basis, and performs the credit authorization according to a new credit application.

Although according to an existing PCC mechanism, the PCRF can deliver the charging control policy, a change of a charging entity during a charging process (this mainly refers to a change from network-layer charging to application-layer charging) and charging data generated before the change cannot be processed accurately, so that the charging control policy delivered by the PCRF may fail to cover all conditions, which may lead to overcharging or undercharging that is difficult to find out, and in turn leads to a more serious problem. Therefore, it is impossible to implement that the PCRF takes control of application-layer charging and network-layer charging for a data service, so that it is impossible to implement, before the charging begins, determining that certain services are only charged at the application layer. In addition, an existing mode for charging for a data service is complex and has many charging triggering points at an application layer, a network layer, and so on. For certain services (for example, an IMS call), charging needs to be triggered only at the application layer, certain services (for example, ordinary new browse) only require triggering charging at the network layer, certain services (for example, download of certain content) are charged at both the application layer and the network layer but at different rates and so on. To avoid repetitive charging, current charging processing is processing during charging or processing after charging. The processing during charging mainly includes online charging correlation. After receiving charging requests reported by different network elements, the online charging system performs charging correlation to avoid repetitive charging. In this process, in one aspect, the processing in the online charging system is complex, for example, transmission of a charging correlation identifier between the network layer and the application layer is hysteretic, and this makes the online charging system fail to perform correlation in an initial charging request but to attempt performing correlation after every charging request comes subsequently, thereby making the processing of the online charging system complex and affecting processing performance; in another aspect, it is difficult to determine through correlation which network element is more reasonable for serving as a charging network element because no service information is available in the online charging system. The processing after charging requires correlation of a large amount of charging information. A large number of charging data records pose a very great burden on the processing, poses a very high requirement on a processing system, and has a great impact on timeliness in billing.

Figure 5:
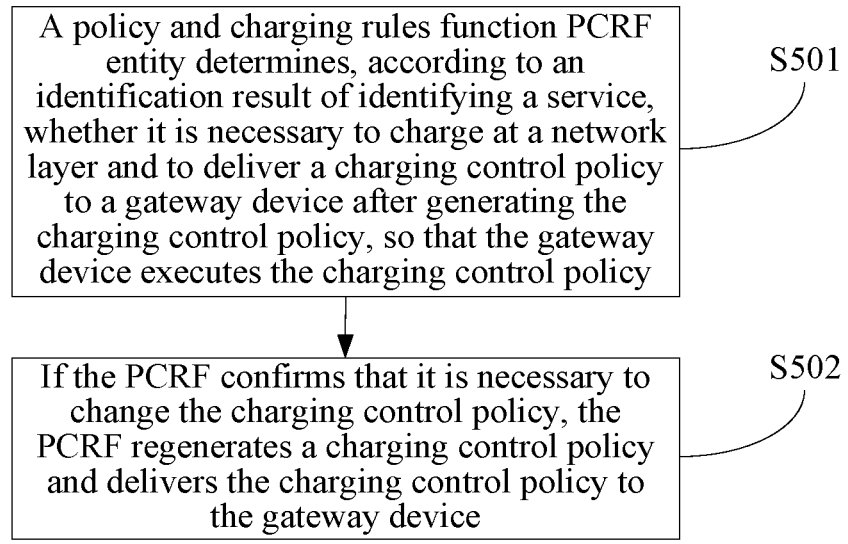
FIG. 5 is a schematic flowchart of a method for charging for a data service according to another embodiment of the present invention.

To solve the preceding problems in the existing PCC mechanism, an embodiment of the present invention provides another method for charging for a data service. Refer to FIG. 5, which is a schematic flowchart of a method for processing a data service according to another embodiment of the present invention. An execution subject of the method may be a policy and charging rules function PCRF entity. The following steps are mainly included:

S501. The policy and charging rules function PCRF entity determines, according to an identification result of identifying a service, whether it is necessary to charge at a network layer and to deliver a charging control policy to a gateway device after generating the charging control policy, so that the gateway device executes the charging control policy.

In this embodiment, a charging rule may be configured in advance both in a PCRF in a home domain and in a charging system, where the charging rule configured in the PCRF includes: a service, whether to charge on a PCEF, and a rate group. The service may be indicated by using an identifier and may also be indicated by using an IP filtering rule identifier.

When the policy and charging rules function PCRF entity receives a policy request message reported by the gateway device, the policy request message may include a service stream filtering rule, the PCRF entity identifies a service according to information reported by the gateway device. Specifically, if the policy request message carries the service data stream filtering rule, the PCRF entity may match the identification rule configured in the PCRF with the service stream filtering rule reported by the gateway device. If the matching succeeds, the service is successfully identified, a charging rule corresponding to the successfully identified service is queried from preconfigured charging rules according to an identification result, and it is determined, according to a query result, whether it is necessary to charge at the network layer, and if yes, a rate group is further determined.

If it is determined, according to the query result, that it is necessary to charge at the network layer, the PCRF generates the charging control policy, where the charging control policy includes a rate group corresponding to the service. Optionally, the charging control policy generated after it is determined, according to the query result, to charge at the network layer further includes a charging mode for charging for the service, such as, online charging or offline charging. If no charging mode is included, a default charging mode of the gateway device is used.

If it is determined, according to the query result, that it is unnecessary to charge at the network layer, the PCRF generates the charging control policy including an indication for not charging for the service, for example, indicating not to perform online charging and not to perform offline charging.

The preceding embodiment is a case where the PCRF entity can successfully match identification rule configured in the PCRF with the service stream filtering rule reported by the gateway device. If the matching fails, the PCRF entity confirms that the service is an unidentifiable service, and the PCRF entity is not sure whether it is necessary to charge the unidentifiable service at the network layer. In this case, the PCRF entity may still generate a charging control policy for the unidentifiable service, which includes that: The PCRF entity generates a charging control policy including a low-priority rate group and/or a general filtering rule for the unidentifiable service, so as to subsequently identify the service, change the rate group, and recharge for a used data stream. Furthermore, when the PCRF entity determines that it is unnecessary to charge for the unidentifiable service at the network layer, the charging control policy generated by the PCRF entity for the unidentifiable service includes a low-priority rate group with a rate of 0. Specifically, according to a service that a subscriber subscribes to, the PCRF entity may determine certain preset general filtering rules and determine a low-priority rate group. The low-priority rate group represents that the charging system needs to perform pricing and fee deduction on a service data stream by selecting another related rate group with a higher priority and considers the low-priority rate group (the low-priority rate group corresponds to a preset rate, and the preset rate may indicate a non-charging rate 0 or another rate) only when no other rate group exists. The charging system may identify the low-priority rate group, and the PCRF generates the charging control policy. The charging control policy includes the preceding determined filtering rules and low-priority rate group, and optionally, may further include the charging mode. If no charging mode is included, the default charging mode of the gateway is used.

After the policy and charging rules function PCRF entity generates the charging control policy and delivers the charging control policy to the gateway device, the gateway device executes the charging control policy. When the gateway executes the charging control policy, two cases are included, that is:

Case 1: The gateway device acquires the charging control policy and knows, according to the charging control policy, a charging indication and a rate group. If the charging indication clearly requires online charging or offline charging to be performed on a specific service data stream, the gateway device performs charging processing according to the rate group. For online charging, firstly credit authorization is reserved in an online charging system, and service usage information is collected based on the authorization. For offline charging, a charging data record is enabled to record the service usage information. The rate group here may be an accurate rate group determined after a service is successfully identified and may also be a low-priority rate group when the service cannot be identified.

Case 2: The gateway device acquires the charging control policy and knows, according to the charging control policy, a charging indication. If the charging indication is that charging is not performed at the network layer, the gateway device does not trigger online or offline charging but allocates bandwidth and QoS to the service data stream and the service is released. Definitely, the gateway device may still generate a charging data record not used for charging, where the charging data record is used for reconciliation and other analysis purposes.

Furthermore, the gateway device reports collected service usage information to the charging system. That is to say, if it is necessary to charge at the network layer, the gateway device collects the service usage information for the service, and when a condition for a charging report is met, reports the collected service usage information. In this embodiment, the condition for reporting includes a change of the rate group, where the change results from a policy of the gateway device itself. In this case, a reporting reason is carried in a reported message indicates that an occurrence of a reporting action results from the change of the rate group.

The charging system receives charging data reported by the gateway device, where the charging data includes the service usage information and the reporting reason for reporting the charging data. If the reporting reason is the change of the rate group, the charging system re-determines, a rate of the service data stream according to the reporting reason and an original rate group and performs fee deduction, which includes:

Embodiment 1: If the original rate group is a high-priority rate group, the rate of the service data stream is re-determined by using the original group. It should be noted that, in the embodiment of the present invention, the so-called high-priority rate group refers to a rate group preferentially used by the charging system to determine a rate, and then perform pricing and fee deduction on the reported service usage information, and so on.

Embodiment 2: If the original rate group is a low-priority rate group, the charging system stores usage information of the service data stream, and when receiving a high-priority rate group, re-determines the rate of the service data stream, or when the charging system does not receive a high-priority rate group, re-determines the rate of the service data stream by using the original rate group. It should be noted that, in the embodiment of the present invention, the low-priority rate group not only represents a rate but also is used to express an indication, that is, indicating that the charging system preferentially uses another high-priority rate group and uses the low-priority rate group only when no high-priority rate group exists.

S502. If the PCRF confirms that it is necessary to change the charging control policy, the PCRF regenerates a charging control policy and delivers the charging control policy to the gateway device.

Confirming, by the PCRF, that it is necessary to change the charging control policy, thereby regenerating a charging control policy and delivering the charging control policy to the gateway device includes the following embodiments:

Embodiment 1: The PCRF correlates an application layer and the network layer of the unidentifiable service according to application-layer information of the unidentifiable service and performs identification on the unidentifiable service. Specifically, when the service data stream arrives at the application layer, an application-layer network element may report the application-layer information of the service to the PCRF, such as, a service identifier and a subscriber identity, and the PCRF correlates the application layer and the network layer of the service based on the application-layer information and identifies the unidentifiable service in step S501. If the PCRF identifies the unidentifiable service, it is determined whether it is necessary to adjust a charging mode and/or a rate group for the identified service. If it is determined that it is necessary to adjust the charging mode and/or the rate group for the identified service, a charging control policy is regenerated. The regenerated charging control policy includes a new charging mode and/or a high-priority rate group allocated to the identified service. The PCRF entity delivers the regenerated charging control policy to the gateway device.

Embodiment 2: The PCRF performs identification on the unidentifiable service according to a received deep packet inspection DPI result, where the DPI result is reported to the PCRF by the gateway device after the gateway device performs, according to a DPI identification rule or a DPI identification rule identifier delivered by the PCRF, identification on the unidentifiable service. Specifically, the PCRF delivers the DPI identification rule to the gateway device based on the following mechanism: The PCRF determines that it is necessary to perform DPI according configuration of an operator or subscription data of a subscriber; for each gateway device, a list of locations of corresponding DPI modules is configured in the PCRF to successfully download a DPI identification rule, as shown in Table 2 below (a GGSN in the GPRS is taken as an example), where DPI Type points out whether a DPI module is built into or built out of the gateway device (for example, a GGSN);

TABLE 2

| GGSN IP | DPI Type | DPI IP/Port | List of rules or list of identifiers supported by a DPI module |
| --- | --- | --- | --- | the PCRF determines, by querying this list, a DPI module corresponding to the gateway device, so as to know whether the gateway device has a DPI capability, and if yes, delivers the DPI identification rule to the gateway device; after receiving the DPI identification rule delivered by the PCRF or a DPI identification rule identifier allocated to the DPI identification rule, the gateway device parses, according to the DPI identification rule or the DPI identification rule matching the DPI identification rule identifier, a service packet of the service data stream to acquire the application-layer information of the service data stream, for example, what is obtained through parsing is a URL of the service data stream, which protocol adopted, which application the service data stream belongs to, what type of application is (for example, a streaming medium), and so on, obtains a DPI result, and reports the DPI result to the PCRF entity. If the PCRF identifies the unidentifiable service, it is determined whether it is necessary to adjust a charging mode and/or a rate group for the identified service. If it is determined that it is necessary to adjust the charging mode and/or the rate group for the identified service, a charging control policy is regenerated. The regenerated charging control policy includes a new charging mode and/or a high-priority rate group allocated to the identified service.

Embodiment 3: The PCRF entity delivers an identification rule identifier to a deep packet inspection DPI network element, so that the DPI network element matches, according to the identification rule identifier, an identification rule or a group of identification rules preconfigured in the DPI network element, detects the packets of the service data stream according to the matched identification rule, and reports a result of the detection to the PCRF entity. The PCRF entity determines, according to the result of the detection, whether it is necessary to change the charging control policy. For example, the PCRF entity may deliver in advance the DPI identification rule or the DPI identification rule identifier and a corresponding charging control policy (including a new charging mode and rate group) to the gateway device according to the policy request message reported by the gateway device. It should be noted that, in this embodiment, the DPI identification rule identifier is used to identify a DPI identification rule or a group of DPI identification rules and may correspond to one or more applications. The identification rule is preconfigured in the DPI module. The DPI identification rule may be of a different granularity for identifying, for example, a certain URL, a certain type of URLs, a certain type of application protocols, a specific application or a certain type of applications (for example, a type of peer-to-peer download). A specific delivering method is described in Embodiment 2 of step S502. If the gateway device detects that the service data stream matches the DPI identification rule delivered in advance or the identification rule corresponding to the DPI identification rule identifier, and the DPI identification rule or the DPI identification rule identifier delivered in advance has a corresponding charging control policy, the gateway device executes the charging control policy.

Embodiment 4: If that the PCRF confirms that it is necessary to change the charging control policy is that the PCRF confirms according to other inputs or triggering conditions, that it is necessary to change the rate group of the service data stream, the charging control policy regenerated and delivered to the gateway device includes a regenerated rate group, so that the gateway device triggers reporting of the charging data to the charging system, where the charging data includes the service usage information and a reporting reason for reporting the charging data and the reporting reason indicates a change of the rate group.

The gateway device performs charging processing according to the charging control policy regenerated by or the charging control policy delivered in advance by the PCRF entity, where the regenerated charging control policy includes an adjustment in the charging mode and/or an adjustment in the rate group, which includes that: if the adjustment in the charging mode is a change from non-charging to charging, the gateway device records the service usage information or reports the service usage information to the online charging system; if the adjustment in the charging mode is a change from charging to non-charging, the gateway device reports service usage information and a reporting reason carries a Final indication to the charging system; and if the regenerated charging control policy includes the adjustment in the rate group, the gateway device reports the charging data to the charging system, so that the charging system performs charging according to the charging data, where the charging data includes the service usage information, the reporting reason for reporting the charging data, and a rate group re-determined by the gateway device. Specifically:

1) If the regenerated charging control policy includes the adjustment in the charging mode, an original charging method is non-charging, and a charging mode after the adjustment is changed into online charging or offline charging, the gateway device performs charging processing according to the rate group. If the charging mode after the adjustment is online charging, firstly credit authorization is reserved in the online charging system, and the service usage information is collected based on the authorization. If the charging mode after the adjustment is offline charging, a charging data record is enabled to record the service usage information. If the original charging method is online charging or offline charging, the charging mode after the adjustment is changed into non-charging, the gateway device disables a current record and reports the service usage information to the charging system, where the reporting reason needs to carry the Final indication.

2) If the regenerated charging control policy includes the adjustment in the rate group, the gateway device disables a counter of the service data stream (the counter corresponds to the original rate group) after detecting that the rate group changes, and reports the service usage information counted by the counter of the service data stream and charging data of other service information to the charging system, where the reported charging data carries the reporting reason, and the reporting reason indicates that the reporting is because of the change of the rate group of the service data stream.

For the charging system in this case, if the reporting reason included in the charging data received by the charging system and reported by the gateway device is the change of the rate group, a rate is determined according to the reporting reason and the original rate group in combination with other parameters, and fee deduction is performed, which includes:

Embodiment 1: If the original rate group is a high-priority rate group, t the rate of the service data stream is re-determined by using the original group. It should be noted that, in the embodiment of the present invention, the so-called high-priority rate group refers to a rate group preferentially used by the charging system to determine a rate, and then perform pricing and fee deduction on the reported service usage information, and so on.

Embodiment 2: If the original rate group is a low-priority rate group, the charging system stores the usage information of the service data stream, and when receiving a high-priority rate group, re-determines the rate of the service data stream, or when the charging system does not receive a high-priority rate group, re-determines the rate of the service data stream by using the original rate group. It should be noted that, in the embodiment of the present invention, the low-priority rate group not only represents a rate but also is used to express an indication, that is, indicating that the charging system preferentially uses another high-priority rate group and uses the low-priority rate group only when no high-priority rate group exists.

If the reporting reason included in the charging data received by the charging system and reported by the gateway device is a Final report, the rate is determined according to the reporting reason and the rate group in combination with other parameters, and fee deduction is performed, which includes that:

If the rate group is a high-priority rate group, where the high priority here means that the charging system preferentially uses this rate group to determine the rate, the original rate group is used to price and perform fee deduction on the reported service usage information, and a charging session is closed.

If the rate group is a low-priority rate group, where the low priority here means that this rate group not only represents a rate but also is used to express an indication, the charging system preferentially uses another high-priority rate group and uses the low-priority rate group only when no high-priority rate group exists, and if the charging system does not receive a new rate group for the service data stream, uses the low-priority rate group to perform rating and fee deduction, if a rate corresponding to the low-priority rate group is 0, does not perform fee deduction on the service usage information corresponding to the service data stream and the rate group during this service charging, and if fee deduction has already been performed, enables a fee return procedure to return the deducted fee and closes a charging session.

It can be seen from the preceding example in FIG. 5 that, a policy and charging rules function PCRF entity can determine, according to an identification result of identifying a service, whether it is necessary to charge at a network layer and to deliver a charging control policy to a gateway device after generating the charging control policy; when a service data stream arrives at an application layer, and the PCRF confirms that it is necessary to change a charging control policy, a charging control policy is regenerated and delivered to the gateway device; furthermore, charging for a data service is implemented based on PCRF configuration and a rate group priority mechanism, this may control certain services to be charged only at the network layer and certain services to be charged at the application layer, and control certain services to be charged only at the application layer, certain services to be charged only at the network layer, and certain services to be charged at both the application layer and the network layer but at different rates and so on. Therefore, compared with an existing PCC mechanism, avoiding a collaboration problem between application-layer charging and network-layer charging from a source avoids repetitive charging, and this, compared with correlation performed by the charging system to avoid repetition between application-layer charging and network-layer charging, reduces difficulties and pressure in charging correlation performed by the charging system and is more effective especially with regard to online charging.

Figure 6:
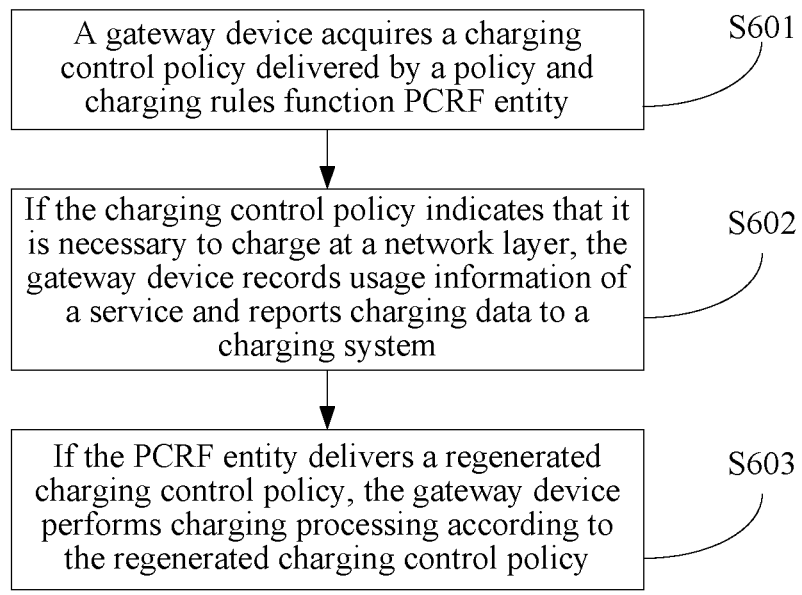
FIG. 6 is a schematic flowchart of a method for charging for a data service according to another embodiment of the present invention.

Refer to FIG. 6, which is a schematic flowchart of a method for charging for a data service according to another embodiment of the present invention. An execution subject of the method may be a gateway device. The following steps are mainly included:

S601. A gateway device acquires a charging control policy delivered by a policy and charging rules function PCRF entity.

The following two specific cases are included:

Case 1: The gateway device acquires the charging control policy and knows, according to the charging control policy, a charging indication and a rate group. If the charging indication clearly requires online charging or offline charging to be performed on a specific service data stream, the gateway device performs charging processing according to the rate group. For online charging, firstly credit authorization is reserved in an online charging system, and service usage information is collected based on the authorization. For offline charging, a charging data record is enabled to record the service usage information. The rate group here may be an accurate rate group determined after a service is successfully identified and may also be a low-priority rate group when the service cannot be identified.

Case 2: The gateway device acquires the charging control policy and knows, according to the charging control policy, a charging indication. If the charging indication is that charging is not performed at a network layer, the gateway device does not trigger online or offline charging but allocates bandwidth and QoS to a service data stream and the service is released. Definitely, the gateway device may still generate a charging data record not used for charging, where the charging data record is used for reconciliation and other analysis purposes.

S602. If the charging control policy indicates that it is necessary to charge at a network layer, the gateway device records usage information of a service and reports charging data to a charging system, where the charging data includes counted service usage information, such as duration or traffic.

That is to say, if it is necessary to charge at the network layer, the gateway device collects the service usage information for the service, and when a condition for a charging report is met, reports the collected service usage information. In this embodiment, the condition for reporting includes a change of the rate group, where the change results from a policy of the gateway device itself. In this case, a reporting reason is carried in a reported message indicates that an occurrence of a reporting action results from the change of the rate group.

S603. If the PCRF entity delivers a regenerated charging control policy, the gateway device performs charging processing according to the regenerated charging control policy, where the regenerated charging control policy includes an adjustment in a charging mode and/or an adjustment in the rate group.

When a service stream arrives at an application layer, the PCRF entity regenerates the charging control policy according to service information reported by an application-layer network element to the PCRF, or the PCRF entity regenerates the charging control policy according to a detection result of the service data stream and delivers the charging control policy to the gateway device, where the detection result is reported by a DPI module specified by the PCRF entity.

If the adjustment in the charging mode is a change from non-charging to charging, the gateway device records the service usage information or reports the service usage information to the online charging system. If the adjustment in the charging mode is a change from charging to non-charging, the gateway device reports service usage information and a reporting reason carries a Final indication to the charging system. If the regenerated charging control policy includes the adjustment in the rate group, the gateway device reports the charging data to the charging system, so that the charging system performs charging according to the charging data, where the charging data includes the service usage information, the reporting reason for reporting the charging data, and a rate group re-determined by the gateway device.

Figure 7:
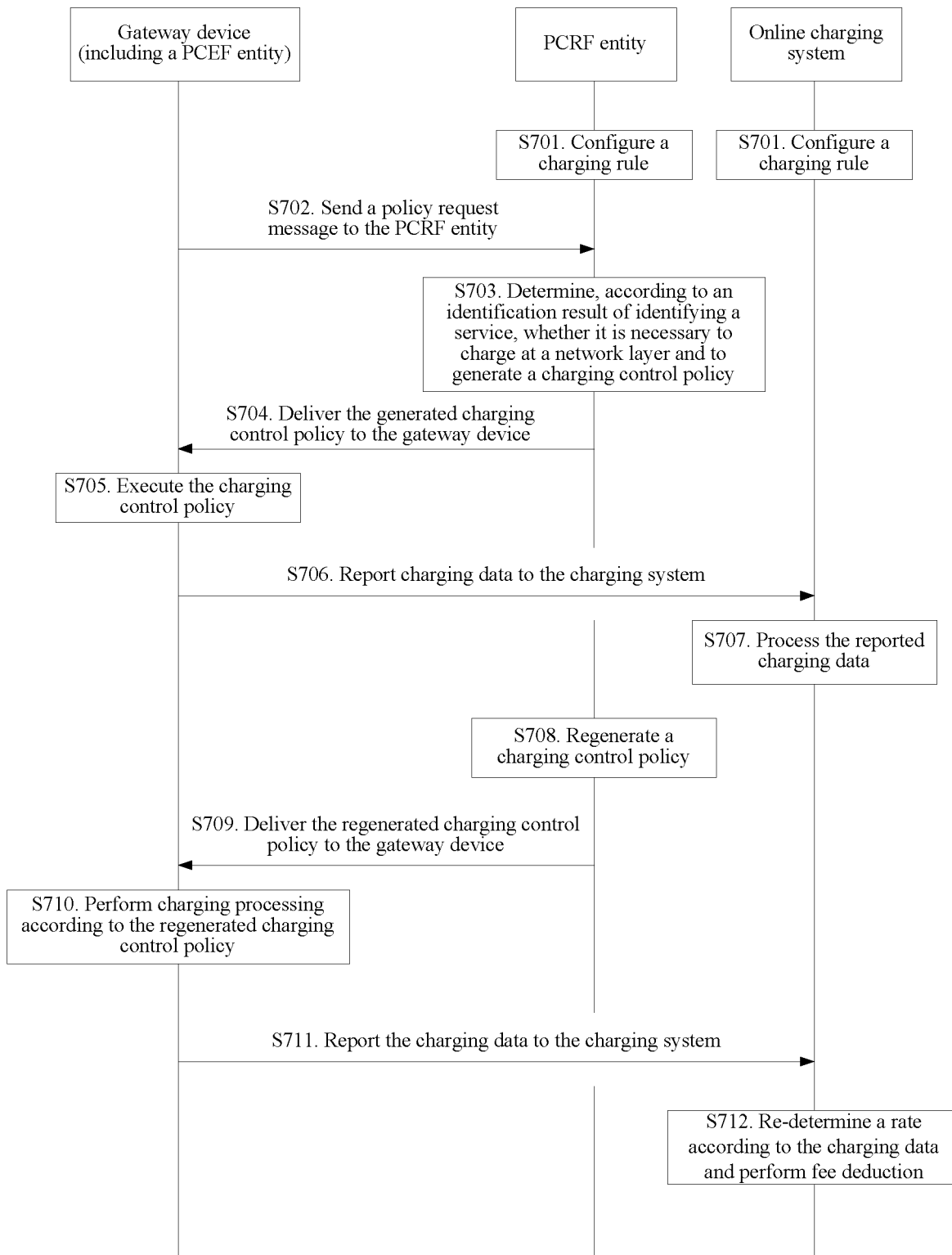
FIG. 7 is a schematic flowchart of interaction of devices in a method for charging for a data service according to another embodiment of the present invention.

The following further describes the method for charging for a data service that is provided by the present invention with reference to the embodiments of FIG. 5 and FIG. 6. Refer to FIG. 7, which is a schematic flowchart of interaction of devices in a method for charging for a data service according to an embodiment of the present invention. The following steps are mainly included:

S701. PCRF in a home domain and a charging system synchronously configure a charging rule.

The charging rule configured in the PCRF includes a service, whether to charge on a PCEF, and a rate group. The service may be indicated by using an identifier and may also be indicated by using an IP filtering rule identifier.

S702. A gateway device sends a policy request message to the policy and charging rules function PCRF entity.

The policy request message may carry a service data stream filtering rule.

S703. The policy and charging rules function PCRF entity determines, according to an identification result of identifying a service, whether it is necessary to charge at a network layer and to generate a charging control policy.

Specifically, the PCRF entity may match the identification rule configured in the PCRF with the service stream filtering rule reported by the gateway device. If the matching succeeds, the service is successfully identified, it is determined, according to the identification result, whether it is necessary to charge at the network layer, and if yes, a rate group is further determined. If it is determined, according to a query result, that it is necessary to charge at the network layer, the PCRF generates the charging control policy, where the charging control policy includes a rate group corresponding to the service. Optionally, the charging control policy generated after it is determined, according to the query result, to charge at the network layer further includes a charging mode for charging for the service, such as, online charging or offline charging. If no charging mode is included, a default charging mode of the gateway device is used. If it is determined, according to the query result, that it is unnecessary to charge at the network layer, determining, according to the query result, t the PCRF generates the charging control policy including an indication for not charging for the service, for example, indicating not to perform online charging and not to perform offline charging.

If the PCRF entity matches the identification rule configured in the PCRF with the service stream filtering rule reported by the gateway device and they cannot be successfully matched, the PCRF entity confirms that the service is an unidentifiable service, and the PCRF entity is not sure whether it is necessary to charge for the unidentifiable service at the network layer. In this case, the PCRF entity may still generate a charging control policy for the unidentifiable service, which includes that: The PCRF entity generates the charging control policy including a low-priority rate group and a general filtering rule for the unidentifiable service. Furthermore, when the PCRF entity determines that it is unnecessary to charge for the unidentifiable service at the network layer, the PCRF entity generates a charging control policy including a low-priority rate group with a rate of 0 for the unidentifiable service. Specifically, according to a service that a subscriber subscribes to, the PCRF entity may determine certain preset general filtering rules and determine a low-priority rate group. The low-priority rate group represents that the charging system needs to perform pricing and fee deduction on a service data stream by selecting another related rate group with a higher priority and considers the low-priority rate group (the low-priority rate group corresponds to a preset rate, and the preset rate may indicate a non-charging rate 0 or another rate) only when no other rate group exists. The charging system may identify the low-priority rate group, and the PCRF generates the charging control policy. The charging control policy includes the preceding determined filtering rules and low-priority rate group, and optionally, may further include the charging mode. If no charging mode is included, the default charging mode of the gateway is used.

S704. The policy and charging rules function PCRF delivers the generated charging control policy to the gateway device.

S705. The gateway device executes the charging control policy.

For online charging, firstly credit authorization is reserved in an online charging system, and service usage information is collected based on the authorization. For offline charging, a charging data record is enabled to record the service usage information.

S706. The gateway device reports charging data to the charging system.

That is to say, if it is necessary to charge at the network layer, the gateway device collects the service usage information for the service, and when a condition for a charging report is met, reports the collected service usage information. In this embodiment, the condition for reporting includes a change of the rate group, where the change results from a policy of the gateway device itself. In this case, a reporting reason is carried in a reported message indicates that an occurrence of a reporting action results from the change of the rate group.

S707. The charging system processes the reported charging data.

If the reporting reason included in the charging data received by the charging system and reported by the gateway device is the change of the rate group, a rate is determined according to the reporting reason and an original rate group in combination with other parameters, and fee deduction is performed, which includes that: If the original rate group is a high-priority rate group, a rate of the service data stream is re-determined by using the original rate group; or if the original rate group is a low-priority rate group, the charging system stores usage information of the service data stream, and when receiving a high-priority rate group, re-determines the rate of the service data stream, or if the charging system does not receive a high-priority rate group, re-determines the rate of the service data stream by using the original rate group.

S708. When the service data stream arrives at an application layer or a DPI module specified by the PCRF entity reports a detection result of the service data stream, and the PCRF entity confirms that it is necessary to change the charging control policy, the PCRF entity regenerates a charging control policy.

S709. The PCRF entity delivers the regenerated charging control policy to the gateway device.

S710. The gateway device performs charging processing according to the regenerated charging control policy, which includes reporting the charging data to the charging system (S711).

That is to say, if an adjustment in the charging mode is a change from non-charging to charging, the gateway device records the service usage information or reports the service usage information to the online charging system. If the adjustment in the charging mode is a change from charging to non-charging, the gateway device reports service usage information and a reporting reason carries a Final indication to the charging system. If the regenerated charging control policy includes the adjustment in the rate group, the gateway device reports the charging data to the charging system, so that the charging system performs charging according to the charging data, where the charging data includes the service usage information, the reporting reason for reporting the charging data, and a rate group re-determined by the gateway device.

S712. The charging system determines a rate according to the charging data and performs fee deduction.

Specifically, if the reporting reason included in the charging data received by the charging system and reported by the gateway device is the change of the rate group, the rate is determined according to the reporting reason and the original rate group in combination with other parameters, and the fee deduction is performed, which includes:

Embodiment 1: If the original rate group is a high-priority rate group, the rate of the service data stream re-determined by using the original rate group. It should be noted that, in the embodiment of the present invention, the so-called high-priority rate group refers to a rate group preferentially used by the charging system to determine a rate, and then perform pricing and fee deduction on the reported service usage information, and so on.

Embodiment 2: If the original rate group is a low-priority rate group, the charging system stores the usage information of the service data stream, and when receiving a high-priority rate group, re-determines the rate of the service data stream, or when the charging system does not receive a high-priority rate group, re-determines the rate of the service data stream by using the original rate group. It should be noted that, in the embodiment of the present invention, the low-priority rate group not only represents a rate but also is used to express an indication, that is, indicating that the charging system preferentially uses another high-priority rate group and uses the low-priority rate group only when no high-priority rate group exists.

If the reporting reason included in the charging data received by the charging system and reported by the gateway device is a Final report, the rate is determined according to the reporting reason and the rate group in combination with other parameters, and fee deduction is performed, which includes that:

If the rate group is a high-priority rate group, where the high priority here means that the charging system preferentially uses this rate group to determine the rate, the original rate group is used to price and perform fee deduction on the reported service usage information, and a charging session is closed.

If the rate group is a low-priority rate group, where the low priority here means that this rate group not only represents a rate but also is used to express an indication, the charging system preferentially uses another high-priority rate group and uses the low-priority rate group only when no high-priority rate group exists, and if the charging system does not receive a new rate group for the service data stream, uses the low-priority rate group to perform rating and fee deduction, if a rate corresponding to the low-priority rate group is 0, does not perform fee deduction on the service usage information corresponding to the service data stream and the rate group during this service charging, and if fee deduction has already been performed, enables a fee return procedure to return the deducted fee and closes a charging session.

Figure 8:
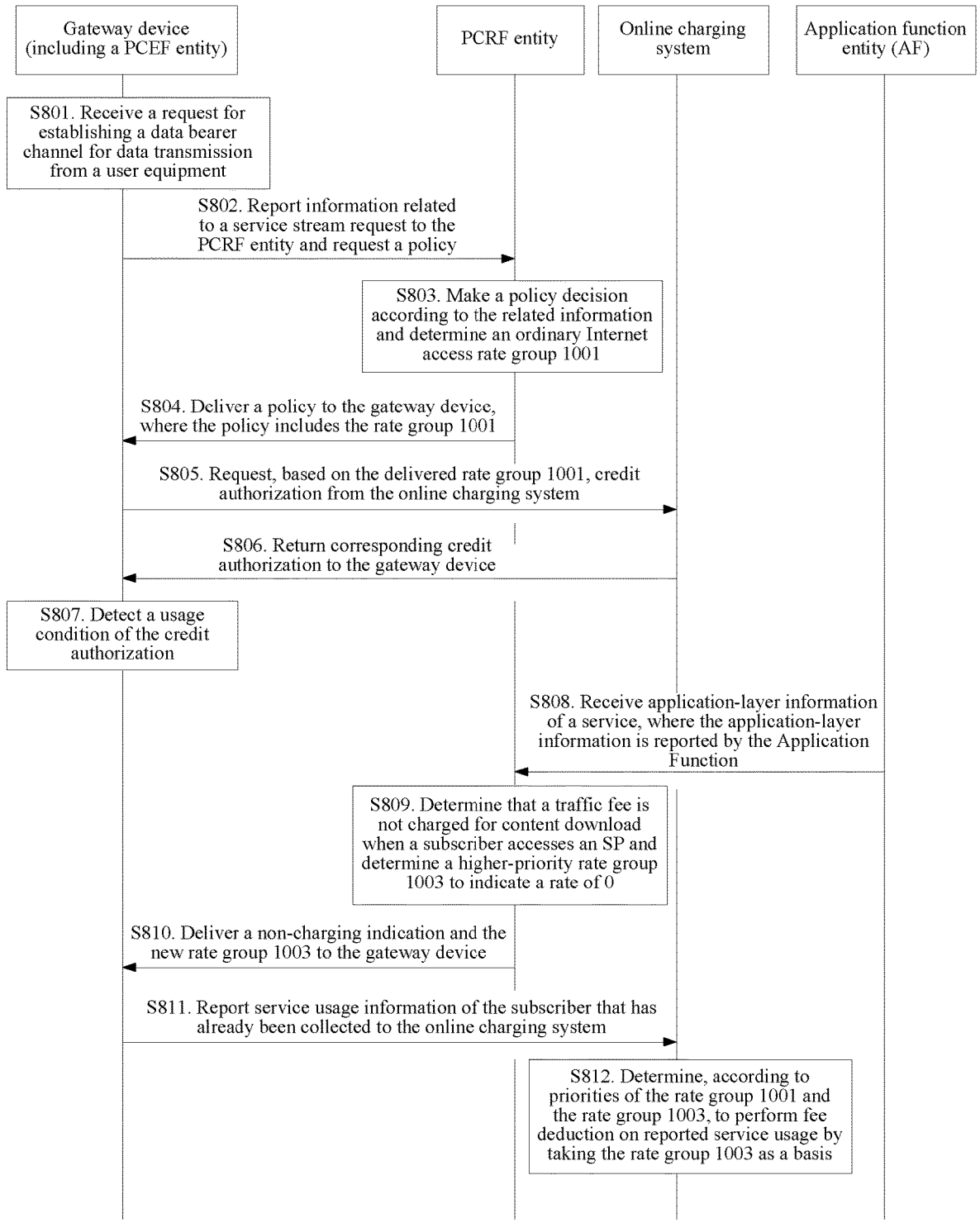
FIG. 8 is a schematic flowchart of interaction of devices in a method for charging for a data service according to another embodiment of the present invention.

The following takes content download (online charging is taken as an example) as an example for description, so as to describe, in a more clearly way, a procedure of interaction of devices in the method for charging for a data service as shown in FIG. 7. Refer to FIG. 8, it is assumed that an operator signs an agreement with a certain SP and the SP wholesales partial traffic, fees are not charged for traffic of certain subscribers of the SP. The example shown in FIG. 8 mainly includes the following steps:

S801. When a subscriber accesses the Internet, a user equipment requests a gateway device (including a PCEF) to establish a data bearer channel for data transmission.

S802. The gateway device reports information related to a service stream to a PCRF and requests a control policy, where the policy includes: QoS, gating, charging control policies, and so on.

S803. According to information related to a service stream that is provided by gateway device and in combination with the configured information configured in the PCRF, subscription information from the outside, subscriber information or the account information of the subscriber, the PCRF makes a policy decision and determines an ordinary Internet access rate group 1001 for the subscriber to access the Internet.

S804. The PCRF delivers a policy to the gateway device, where the policy carries the rate group 1001.

S805. The gateway device requests, based on the rate group 1001 delivered by the PCRF, credit authorization from an online charging system.

S806. The online charging system determines a rate according to a subscriber type, a package type, a reward policy, rate group information, and so on, performs the credit authorization according to the rate and the account information of the subscriber, and returns corresponding credit authorization to the gateway device.

S807. The subscriber uses a service, and the gateway device detects a usage condition of the credit authorization, and after the subscriber passes authentication of a specific service provider (Service Provider, SP), the SP gives a feedback to the operator that traffic of the subscriber is counted into the wholesale traffic and a fee is not charged for the traffic of the subscriber.

S808. The PCRF entity receives application-layer information of the service, where the application-layer information is reported by an application function (Application Function, AF);

S809. Based on the application-layer information and/or a detection result, the PCRF entity remakes a policy decision, determines that a traffic fee is not charged for content download when the subscriber accesses the SP, and determines a higher-priority rate group 1003 indicating a rate of 0.

S810. The PCRF delivers a non-charging indication and the new rate group 1003 to the gateway device.

S811. After receiving the indication, the gateway device reports service usage information (the reported information carries a Final-Unit-Indication and the rate group 1003) of the subscriber that has already been collected to the online charging system, and closes a charging session of the service after the reporting is complete.

S812. After receiving the service usage information reported by the gateway device, the online charging system decides, according to priorities of the rate group 1001 and the rate group 1003, to perform fee deduction on the reported service usage information by taking the rate group 1003 as a basis, and the online charging system does not charge for the reported service usage information because the rate group 1003 indicates the rate of 0, and if a fee has already been deducted, a return is performed.

Figure 9:
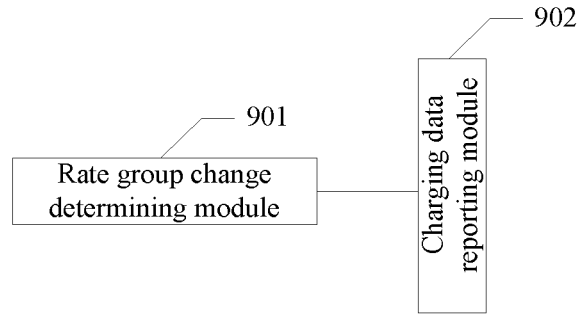
FIG. 9 is a schematic diagram of a logical structure of a gateway device according to an embodiment of the present invention.

Refer to FIG. 9, which is a schematic diagram of a logical structure of a gateway device according to an embodiment of the present invention. For ease of description, only parts related to the embodiment of the present invention are presented. Functional modules/units included in a gateway device that are shown in FIG. 9 may be software modules/units, hardware modules/units, or software-hardware combined modules/units, and include a rate group change determining module 901 and a charging data reporting module 902, where:

the rate group change determining module 901 is configured to determine whether a rate group of a service data stream changes, where the rate group has a priority attribute, that is, rate groups may have a different priority, so that the charging system is capable of determining an appropriate rate group for service usage information according to the priority of the rate group and performing charging according to the determined rate group; and the charging data reporting module 902 is configured to report charging data to the charging system if the rate group change determining module 901 determines that the rate group of the service data stream changes, so that the charging system performs charging according to the charging data, where in this embodiment, the charging data includes the service usage information and a reporting reason for reporting the charging data, and the reporting reason indicates a change of the rate group.

It should be noted that, in the preceding embodiment of the gateway device, the division of each functional module is only an exemplary description. In practical applications, the preceding functions may be allocated, according to demands, for example, a requirement of corresponding hardware configuration or consideration of convenience in software implementation, to different functional modules for completion. That is to say, an internal structure of the gateway device is divided into different functional modules to complete all or a part of the functions described above. In addition, in practical applications, a corresponding functional module in this embodiment may be implemented by corresponding hardware, and may also be completed by corresponding hardware by executing corresponding software. For example, the preceding rate group change determining module may be hardware executing the preceding determining of the change of the rate group of the service data stream. For example, a rate group change determiner may also be an ordinary processor or another hardware device that can execute a corresponding computer program to complete the preceding functions. For another example, the preceding charging data reporting module may also be hardware executing the preceding function of reporting, when the rate group change determining module (or the rate group change determiner) determines that the rate group of the service data stream changes, the charging data to the charging system. For example, a charging data reporter may also be an ordinary processor or another hardware device that can execute a corresponding computer program to complete the preceding functions. The division of each functional module/unit in the following embodiments is similar and will not be described herein again.

Figure 10:
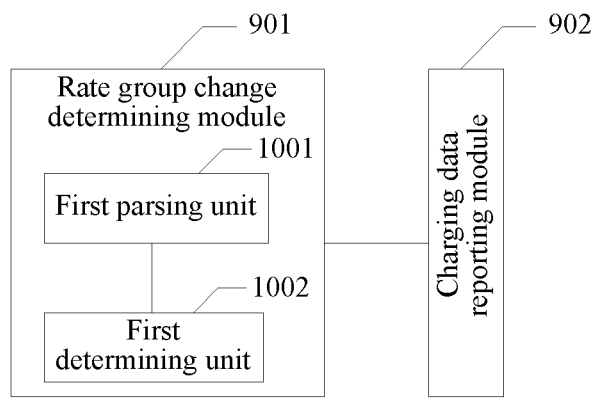
FIG. 10 is a schematic diagram of a logical structure of a gateway device according to another embodiment of the present invention.

The rate group change determining module 901 shown in FIG. 9 may further include a first parsing unit 1001 and a first determining unit 1002, as shown in a gateway device, provided by another embodiment of the present invention, shown in FIG. 10, where:

the first parsing unit 1001 is configured to parse a service packet of the service data stream according to a service identification rule; and the first determining unit 1002 is configured to re-determine, according to a parsed result and rate group configuration in the gateway device, a rate group, and if the re-determined rate group is different from a current rate group, to determine that the rate group of the service data stream changes.

Figure 11:
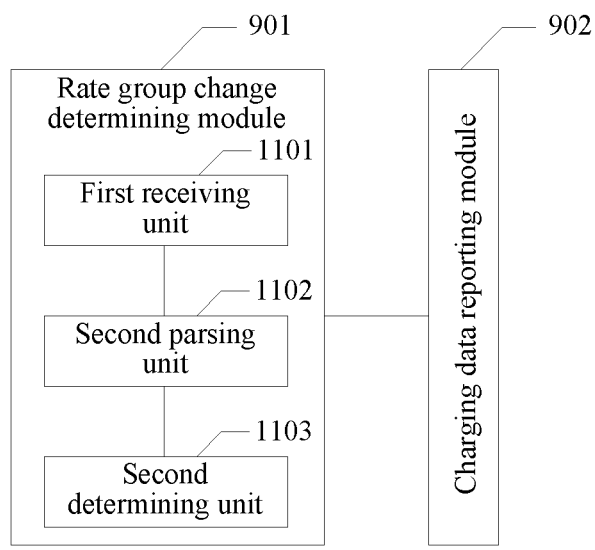
FIG. 11 is a schematic diagram of a logical structure of a gateway device according to another embodiment of the present invention.

The rate group change determining module 901 shown in FIG. 9 may further include a first receiving unit 1101, a second parsing unit 1102, and a second determining unit 1103, as shown in a gateway device, provided by another embodiment of the present invention, shown in FIG. 11, where:

the first receiving unit 1101 is configured to receive an identification rule and a corresponding charging control policy that are delivered by a policy and charging rules function PCRF entity, where the charging control policy includes a rate group;

the second parsing unit 1102 is configured to parse a service packet of the service data stream according to the identification rule delivered by the PCRF entity; and the second determining unit 1103 is configured to match, according to a parsed result, the rate group delivered by the PCRF entity, so as to re-determine a rate group, and if the re-determined rate group is different from a current rate group, to determine that the rate group of the service data stream changes.

Figure 12:
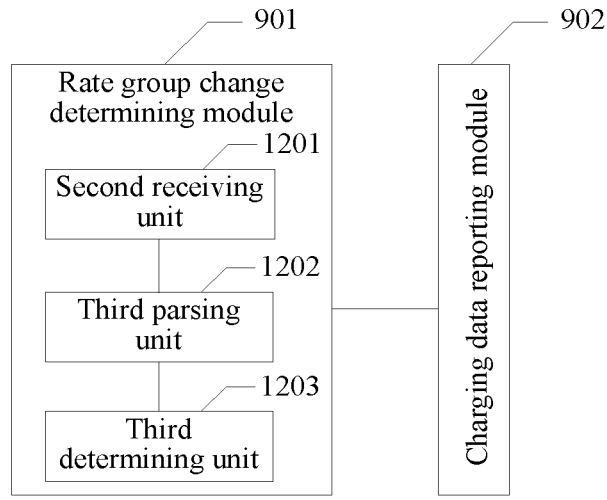
FIG. 12 is a schematic diagram of a logical structure of a gateway device according to another embodiment of the present invention.

The rate group change determining module 901 shown in FIG. 9 may further include a second receiving unit 1201, a third parsing unit 1202, and a third determining unit 1203, as shown in a gateway device, provided by another embodiment of the present invention, shown in FIG. 12, where:

the second receiving unit 1201 is configured to receive an identification rule identifier and a corresponding charging control policy that are delivered by a policy and charging rules function PCRF entity, where the charging control policy includes a rate group;

the third parsing unit 1202 is configured to match, by using the identification rule identifier delivered by the PCRF entity, an identification rule configured in the gateway device, and parse the service packet of the service data stream according to the matched identification rule; and the third determining unit 1203 is configured to match, according to the parsed result, the rate group delivered by the PCRF entity, so as to re-determine a rate group, and if the re-determined rate group is different from a current rate group, to determine that the rate group of the service data stream changes.

Figure 13:
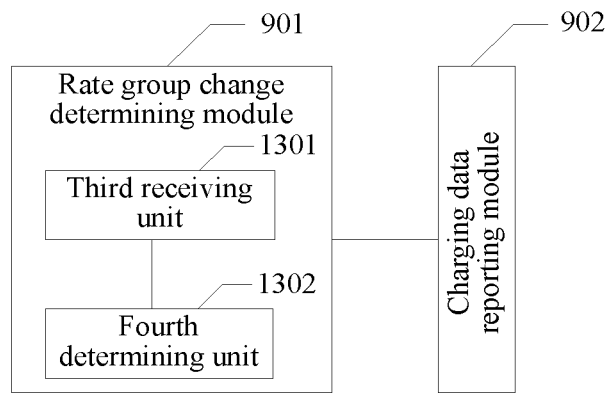
FIG. 13 is a schematic diagram of a logical structure of a gateway device according to another embodiment of the present invention.

The rate group change determining module 901 shown in FIG. 9 may further include a third receiving unit 1301 and a fourth determining unit 1302, as shown in a gateway device, provided by another embodiment of the present invention, shown in FIG. 13, where:

the third receiving unit 1301 is configured to receive a charging control policy update command delivered by a policy and charging rules function PCRF entity, where the charging control policy update command includes a rate group; and the fourth determining unit 1302 is configured to: if the rate group included in the charging control policy update command is different from a current rate group, determine that the rate group of the service data stream changes.

Figure 14:
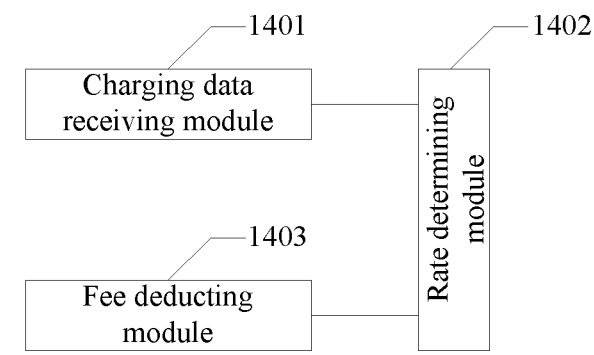
FIG. 14 is a schematic diagram of a logical structure of a charging system according to an embodiment of the present invention.

Refer to FIG. 14, which is a schematic diagram of a logical structure of a charging system according to an embodiment of the present invention. For ease of description, only parts related to the embodiment of the present invention are presented. Functional modules/units included in the charging system that are shown in FIG. 14 may be software modules/units, hardware modules/units, or software-hardware combined modules/units, and include a charging data receiving module 1401, a rate determining module 1402, and a fee deducting module 1403, where:

the charging data receiving module 1401 is configured to receive charging data reported by a gateway device when the gateway device determines that a rate group of a service data stream changes, where the charging data includes service usage information and a reporting reason for reporting the charging data, and the reporting reason indicates a change of the rate group;

the rate determining module 1402 is configured to determine a rate of the service data stream according to the reporting reason and an original rate group; and the fee deducting module 1403 is configured to perform, according to the determined rate, fee deduction on the service usage information.

In this embodiment, the rate group has a priority attribute, that is, rate groups may have a different priority.

Figure 15:
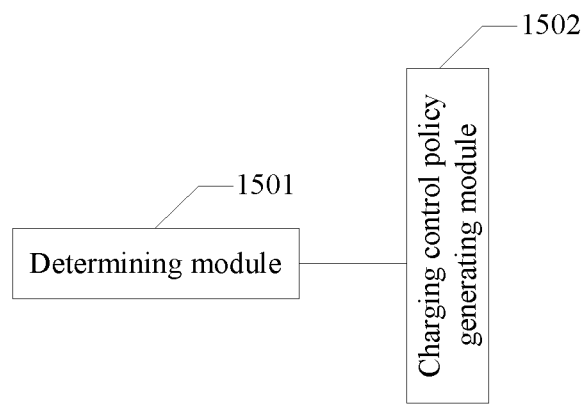
FIG. 15 is a schematic diagram of a logical structure of a policy and charging rules function entity according to an embodiment of the present invention.

Refer to FIG. 15, which is a schematic diagram of a logical structure of a policy and charging rules function entity according to an embodiment of the present invention. For ease of description, only parts related to the embodiment of the present invention are presented. Functional modules/units included in the PCRF entity that are shown in FIG. 15 may be software modules/units, hardware modules/units, or software-hardware combined modules/units, and include a determining module 1501 and a charging control policy generating module 1502, where:

the determining module 1501 is configured to determine, according to an identification result of identifying a service, whether it is necessary to charge at a network layer and to deliver a charging control policy to a gateway device after generating the charging control policy, so that the gateway device executes the charging control policy; and the charging control policy generating module 1502 is configured to regenerate, if it is confirmed that it is necessary to change the charging control policy, a charging control policy and to deliver the charging control policy to the gateway device.

In another embodiment of the present invention, the charging control policy generating module 1502 is specifically configured to do as follows: if that it is confirmed that it is necessary to change the charging control policy is that it is confirmed that it is necessary to change a rate group of a service data stream, the charging control policy regenerated and delivered to the gateway device includes a regenerated rate group, so that the gateway device triggers reporting of charging data to the charging system. The charging data includes service usage information and a reporting reason for reporting the charging data, and the reporting reason indicates a change of the rate group. In this embodiment, the rate group has a priority.

Figure 16:
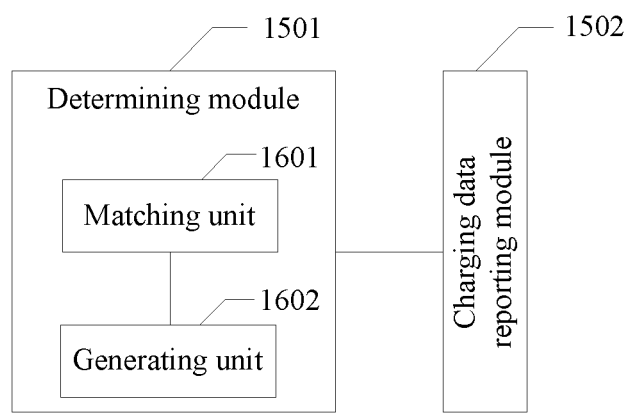
FIG. 16 is a schematic diagram of a logical structure of a policy and charging rules function entity according to another embodiment of the present invention.

The determining module 1501 shown in FIG. 15 may further include a matching unit 1601 and a generating unit 1602, as shown in a policy and charging rules function entity, provided by another embodiment of the present invention, shown in FIG. 16, where:

the matching unit 1601 is configured to match a configured identification rule of the PCRF entity itself with service stream information reported by the gateway device; and the generating unit 1602 is configured to: if the matching unit 1601 fails to perform the matching successfully, confirm that a service is an unidentifiable service, and to generate a charging control policy including a low-priority rate group, so as to subsequently change the rate group after the service identification and to recharge a used data stream.

Persons of ordinary skill in the art understand that all or part of the steps of the methods in the embodiments may be implemented by a program instructing relevant hardware. The program may be stored in a computer readable storage medium, and the storage medium may be a read-only memory (ROM, Read Only Memory), a random access memory (RAM, Random Access Memory), a magnetic disk, an optical disk, or the like.

The preceding describes in detail a method for processing a rate group, a method for charging for a data service, and a related device and system that are provided by the embodiments of the present invention. Specific cases are applied or illustrating principles and the embodiments of the present invention. The foregoing description about the embodiments is merely for ease of understanding the methods and core ideas of the present invention. Meanwhile, persons of ordinary skill in the art may make modifications to specific implementation manners and application scopes according to the ideas of the present invention. In conclusion, the content of this specification should not be construed as a limitation on the present invention.

What is claimed is:

1. A charging method for a data service, comprising:
   obtaining a Deep Packet Inspection (DPI) identification rule identifier and a corresponding charging control policy;
   detecting that a service data stream corresponding to the data service matches a DPI identification rule corresponding to the DPI identification rule identifier; and
   executing the charging control policy for the service data stream.

2. The method according to claim 1, wherein the obtaining a DPI identification rule identifier and a corresponding charging control policy comprises:
   obtaining the DPI identification rule identifier and the corresponding charging control policy that are preconfigured in a gateway device; or
   receiving the DPI identification rule identifier and the corresponding charging control policy that are delivered by a policy decision entity.

3. The method according to claim 2,
   wherein receiving the DPI identification rule identifier and the corresponding charging control policy comprises receiving, by a gateway device, the DPI identification rule identifier and the corresponding charging control policy from the policy decision entity; and
   wherein the method further comprises sending, by the policy decision entity, the DPI identification rule identifier and the corresponding charging control policy to the gateway device.

4. The method according to claim 1, further comprising:
   identifying the DPI identification rule according to the DPI identification rule identifier.

5. The method according to claim 1, wherein the DPI identification rule is for identifying application-layer information of the service data stream, wherein the application-layer information comprises at least one of a uniform resource locator, URL, a type of URLs, a type of application protocols, an application or a type of applications.

6. The method according to claim 1, wherein the executing the charging control policy for the service data stream comprises:
   performing charging processing for the service data stream according to the charging control policy.

7. The method according to claim 6, wherein the charging control policy comprises a rate group, and wherein the performing charging processing for the service data stream according to the charging control policy comprises:
   determining that the rate group of the service data stream changes; and
   reporting charging data to a charging system, wherein the charging data comprises usage information of the service data stream.

8. The method according to claim 7, wherein the rate group has a priority attribute, and the method further comprises:
   determining, by the charging system according to the priority attribute, an appropriate rate group.

9. The method according to claim 7, wherein the performing charging processing for the service data stream according to the charging control policy further comprises:
   enabling a new counter to record new usage information of the service data stream.

10. The method according to claim 7, wherein the performing charging processing for the service data stream according to the charging control policy further comprises:
    applying, based on the rate group, to the charging system for credit authorization;
    receiving credit authorization granted by the charging system.

11. The method according to claim 7, wherein the charging data further comprises the rate group.

12. The method according to claim 7 further comprising performing, by the charging system, charging according to the charging data.

13. The method according to claim 6, wherein the performing charging processing for the service data stream according to the charging control policy comprises:

collecting usage information for the service data stream based on authorized credit.

14. The method according to claim 6, wherein the performing charging processing for the service data stream according to the charging control policy comprises:
enabling or disabling a charging data record for recording usage information of the service data stream.

15. A communications system, comprising:
a gateway device, wherein the gateway device is configured to:
obtain a Deep Packet Inspection (DPI) identification rule identifier and a corresponding charging control policy;
detect that a service data stream corresponding to the data service matches a DPI identification rule corresponding to the DPI identification rule identifier; and
execute the charging control policy for the service data stream.

16. The communications system according to claim 15, wherein the gateway device is further configured to obtain the DPI identification rule identifier and the corresponding charging control policy that are preconfigured in the gateway device; or
wherein the communications system further comprises a policy decision entity, wherein the policy decision entity is configured to deliver the DPI identification rule identifier and the corresponding charging control policy to the gateway device, and the gateway device is further configured to receive the DPI identification rule identifier and the corresponding charging control policy that are delivered by the policy decision entity.

17. The communications system according to claim 15, wherein the communications system further comprises a charging system, the charging control policy comprises a rate group, and the gateway device is further configured to:
determine that the rate group of the service data stream changes; and
report charging data to the charging system, wherein the charging data comprises usage information of the service data stream;
and the charging system is configured to perform charging according to the charging data.

18. The communications system according to claim 17, wherein the gateway device is further configured to enable a new counter to record new usage information of the service data stream.

19. The communications system according to claim 17, wherein the gateway device is further configured to:
apply, based on the rate group, to the charging system for credit authorization; and
receive credit authorization granted by the charging system.

20. The communications system according to claim 17, wherein the charging data further comprises the rate group.

21. The communications system according to claim 17, wherein the gateway device is further configured to:
collect usage information for the service data stream based on authorized credit; or
enable or disable a charging data record for recording usage information of the service data stream.

22. A gateway device, wherein the gateway device is configured to:
obtain a Deep Packet Inspection (DPI) identification rule identifier and a corresponding charging control policy;
detect that a service data stream corresponding to the data service matches a DPI identification rule corresponding to the DPI identification rule identifier; and
execute the charging control policy for the service data stream.

23. The gateway device according to claim 22, wherein the gateway device is further configured to:
obtain the DPI identification rule identifier and the corresponding charging control policy that are preconfigured in a gateway device; or
receive the DPI identification rule identifier and the corresponding charging control policy that are delivered by a policy decision entity.

24. The gateway device according to claim 22, wherein the gateway device is further configured to:
determine that the rate group of the service data stream changes; and
report charging data to the charging system, wherein the charging data comprises usage information of the service data stream.

25. The gateway device according to claim 24, wherein the gateway device is further configured to enable a new counter to record new usage information of the service data stream.

26. The gateway device according to claim 24, wherein the gateway device is further configured to:
apply, based on the rate group, to the charging system for credit authorization; and
receive credit authorization granted by the charging system.

27. The gateway device according to claim 24, wherein the charging data further comprises the rate group.

28. The gateway device according to claim 24, wherein the gateway device is further configured to:
collect usage information for the service data stream based on authorized credit; or
enable or disable a charging data record for recording usage information of the service data stream.

* * * * *